(12) United States Patent
Taylor

(10) Patent No.: US 9,995,483 B2
(45) Date of Patent: Jun. 12, 2018

(54) BURNER WITH OXYGEN AND FUEL MIXING APPARATUS

(71) Applicant: Honeywell International Inc., Morristown, NJ (US)

(72) Inventor: Curtis Taylor, Gaston, IN (US)

(73) Assignee: Honeywell International Inc., Morris Plains ( * ) Notice: Subject to any disclaimer, the term of this patent is extended or adjusted under 35 U.S.C. 154(b) by 630 days.

(21) Appl. No.: 14/574,880

(22) Filed: Dec. 18, 2014

(65) Prior Publication Data

US 2015/0167971 A1 Jun. 18, 2015

Related U.S. Application Data

(63) Continuation of application No. 13/303,198, filed on Nov. 23, 2011, now Pat. No. 8,920,159.

(51) Int. Cl.
| | |
|---|---|
| *F23L 7/00* | (2006.01) |
| *F23C 9/00* | (2006.01) |
| *F23D 1/00* | (2006.01) |
| *F23D 14/32* | (2006.01) |
| *F23D 14/62* | (2006.01) |
| *F23L 5/02* | (2006.01) |
| *F23L 9/00* | (2006.01) |

(52) U.S. Cl.
CPC .............. *F23L 7/007* (2013.01); *F23C 9/00* (2013.01); *F23C 9/003* (2013.01); *F23D 1/00* (2013.01); *F23D 1/005* (2013.01); *F23D 14/32* (2013.01); *F23D 14/62* (2013.01); *F23L 5/02* (2013.01); *F23L 9/00* (2013.01); *F23C 2202/30* (2013.01); *F23D 2201/10* (2013.01); *F23D 2900/00006* (2013.01); *Y02E 20/344* (2013.01)

(58) Field of Classification Search
CPC .............. F23D 1/00; F23D 1/04; F23L 7/007
USPC .............. 110/104 B, 261, 263, 204; 431/187
See application file for complete search history.

(56) References Cited

U.S. PATENT DOCUMENTS

| | | | | |
|---|---|---|---|---|
| 3,594,154 A | * | 7/1971 | Kanokogi | C21B 5/008 266/141 |
| 3,741,166 A | * | 6/1973 | Bailey | F23C 9/006 122/23 |
| 4,380,429 A | * | 4/1983 | LaHaye | F23C 7/008 431/115 |
| 4,488,869 A | * | 12/1984 | Voorheis | F23C 6/045 239/405 |
| 4,525,138 A | | 6/1985 | Snyder et al. | |
| 4,556,384 A | | 12/1985 | Laurenceau et al. | |
| 5,411,394 A | * | 5/1995 | Beer | F23C 7/006 110/262 |
| 5,692,891 A | * | 12/1997 | Chow | F23D 14/58 431/170 |

(Continued)

FOREIGN PATENT DOCUMENTS

WO WO 2007101427 A1 * 9/2007 .............. F23C 7/004

OTHER PUBLICATIONS

WO 2007101427 A1—English translation.*

*Primary Examiner* — Jorge Pereiro
(74) *Attorney, Agent, or Firm* — Brooks, Cameron & Huebsch, PLLC

(57) ABSTRACT

An apparatus is provided for combining oxygen and fuel to produce a mixture to be burned in a burner. The oxygen-fuel mixture is ignited in a fuel-ignition zone in a flame chamber to produce a flame.

20 Claims, 18 Drawing Sheets

(56) References Cited

U.S. PATENT DOCUMENTS

| | | | |
|---|---|---|---|
| 6,019,595 A * | 2/2000 | Wulfert | F23D 14/22 239/422 |
| 6,843,185 B1 | 1/2005 | Taylor | |
| 7,028,622 B2 | 4/2006 | Taylor | |
| 8,246,343 B2 * | 8/2012 | Ghani | F23C 3/008 431/10 |
| 8,505,496 B2 | 8/2013 | Douglas et al. | |
| 8,689,710 B2 * | 4/2014 | Slavejkov | F23C 6/04 110/104 B |
| 8,911,700 B2 * | 12/2014 | Millner | C21B 5/06 266/155 |
| 8,920,159 B2 | 12/2014 | Taylor | |
| 2004/0194681 A1 | 10/2004 | Taylor | |
| 2004/0261671 A1 * | 12/2004 | Taylor | F23C 9/003 110/261 |
| 2005/0132941 A1 * | 6/2005 | Taylor | F23C 6/045 110/265 |
| 2005/0239005 A1 * | 10/2005 | Lugnet | F23C 9/006 431/8 |
| 2007/0125282 A1 * | 6/2007 | Varagani | F23D 1/00 110/263 |
| 2007/0207426 A1 | 9/2007 | Perry et al. | |
| 2008/0160464 A1 | 7/2008 | Ghani et al. | |
| 2010/0077942 A1 | 4/2010 | D'Agostini et al. | |
| 2010/0077944 A1 | 4/2010 | Slavejkov et al. | |
| 2010/0081098 A1 | 4/2010 | D'Agostini et al. | |
| 2010/0236500 A1 | 9/2010 | Douglas et al. | |
| 2013/0098278 A1 * | 4/2013 | Wang | F23D 1/00 110/265 |
| 2013/0175365 A1 * | 7/2013 | Ergut | F23D 14/22 239/407 |

\* cited by examiner

US 9,995,483 B2

BURNER WITH OXYGEN AND FUEL MIXING APPARATUS

CROSS REFERENCE TO RELATED APPLICATION

This application is a continuation of U.S. application Ser. No. 13/303,198, filed Nov. 23, 2011, the entire specification of which is incorporated herein by reference.

BACKGROUND

The present disclosure relates to burner assemblies, and particularly to oxygen-fuel burner assemblies. More particularly, the present disclosure related to apparatus for using recycled flue gas in a burner assembly.

SUMMARY

According to the present disclosure, an apparatus is provided for combining oxygen and fuel to produce a mixture to be burned in a burner. The apparatus comprises a fuel supply tube configured to communicate a stream of fuel to a fuel-ignition zone provided, for example, by a flame chamber formed in a refractory shape coupled to a downstream end of the fuel supply tube. The apparatus further includes an oxygen supply tube for conducting oxygen to an oxygen-fuel mixer configured to discharge oxygen into the stream of fuel flowing through the fuel supply tube to produce an oxygen-fuel mixture that is discharged into the fuel-ignition zone in the flame chamber.

In illustrative embodiments, an apparatus is provided for combining recycled flue gas, oxygen, and fuel to produce an ignitable fluid to be burned in a burner. The apparatus comprises a primary oxygen supply tube and a fuel supply tube. The fuel supply tube is formed to include a fuel transport passageway and oxygen-injection holes opening into the fuel transport passageway. The fuel supply tube is arranged to extend into the primary oxygen supply tube to form an oxygen flow passage therebetween to communicate a primary stream of oxygen flowing in the oxygen flow passage through the oxygen-injection holes formed in the fuel supply tube to mix with fuel conducted through the fuel transport passageway prior to combustion to produce a combustible oxygen-fuel mixture. The apparatus further includes flue-gas recycling means for combining a secondary stream of oxygen and a first stream of recycled flue gas to flow in a first recycled flue gas passage that is separated from the oxygen flow passage to produce a first stream of oxygen-enriched flue gas separately from the combustible oxygen-fuel mixture and for combining the first stream of oxygen-enriched flue gas and the combustible oxygen-fuel mixture to produce an ignitable fluid in a flame chamber arranged to communicate with the fuel transport passageway and the first recycled flue gas passage. In illustrative embodiments, the apparatus further includes oxygen-distribution controller means for varying the volume percentage of oxygen in each of the combustible oxygen-fuel mixture and the first stream of oxygen-enriched flue gas to provide the ignitable fluid with an oxygen content of at least 20.9% so that the ignitable fluid can be ignited to produce a burn for various ranks of fuel and recycled flue gas admitted into the burner to produce the combustible oxygen-fuel mixture and the oxygen-enriched flue gas.

Various combinations of oxygen-fuel mixtures and recycled flue gas cooperate to produce an ignitable fluid that is suitable to be ignited in a flame chamber of an air-fuel combustion system. In a first illustrative embodiment, the ignitable fluid comprises an oxygen-fuel mixture and a first stream of oxygen-enriched flue gas. In a second illustrative embodiment, the ignitable fluid further comprises a second stream of (non-oxygen-enriched) flue gas. In a third illustrative embodiment, the ignitable fuel instead further comprises a second stream of oxygen-enriched flue gas.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
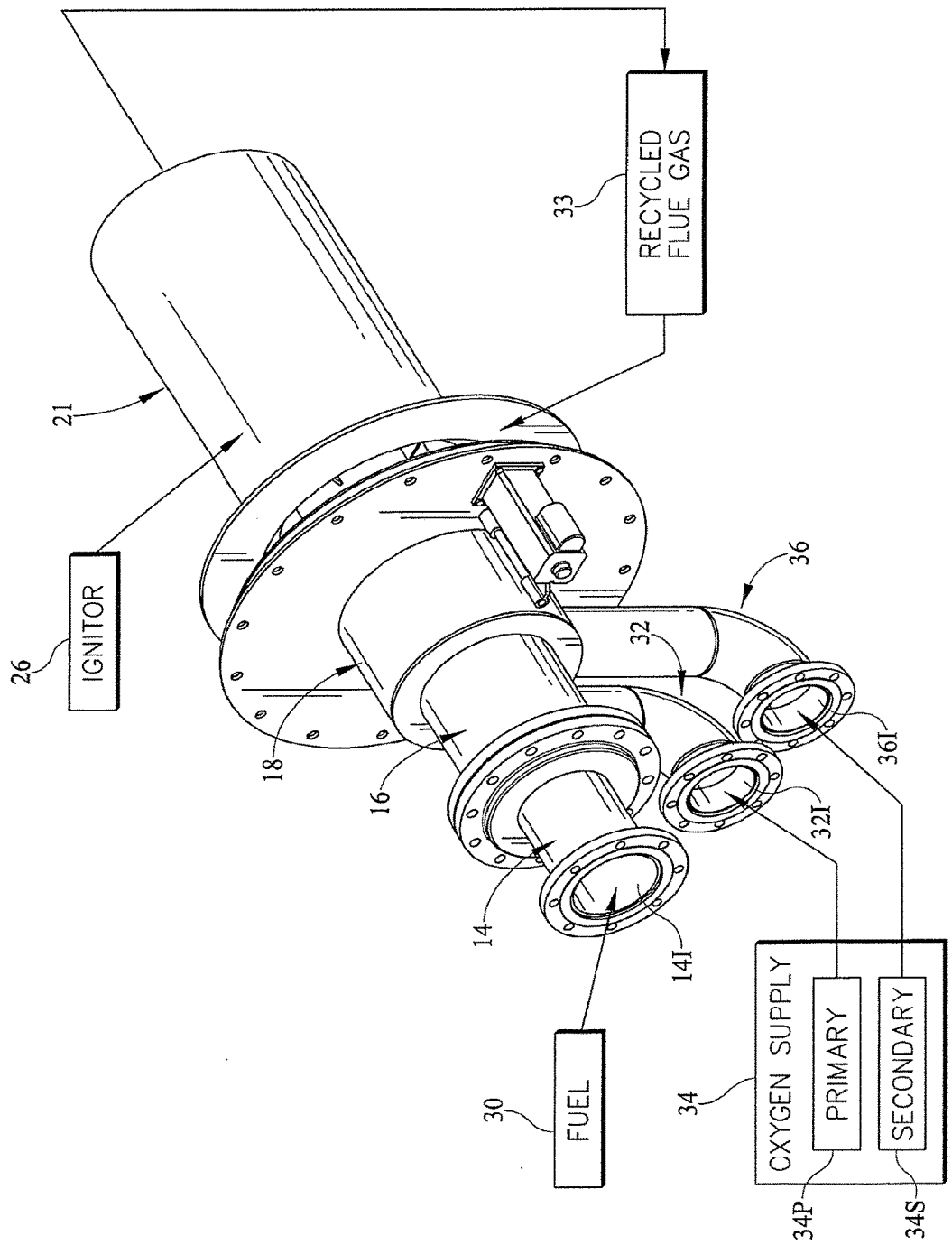
FIG. 1 is a diagrammatic illustration of an oxygen-fuel-flue gas combustion system in accordance with a first embodiment of the present disclosure showing that the system includes an illustrative burner formed to include a fuel inlet provided in a fuel supply tube, a primary oxygen supply inlet provided in an upstream elbow-shaped first oxygen-transfer tube associated with a primary oxygen supply tube that extends along, around, and in concentric relation to the fuel supply tube, a secondary oxygen supply inlet provided in a downstream elbow-shaped second oxygen transfer tube associated with a secondary oxygen supply tube, and a recycled flue gas inlet.

Oxygen-fuel-flue gas combustion systems are disclosed herein for combining oxygen, fuel, and recycled flue gas to produce an ignitable fluid in a flame chamber. A combustion system 10 in accordance with a first embodiment of the present disclosure is illustrated in FIGS. 1-5 and includes oxygen-enriched flue gas stream 10B in an ignitable fluid 28. A combustion system 100 in accordance with a second embodiment of the present disclosure is illustrated in FIGS. 6-10 and includes a first stream 100B of oxygen-enriched flue gas and a second stream 332 of inert (non-oxygen enriched) recycled flue gas in an ignitable fluid 128. A combustion system 200 in accordance with a third embodiment of the present disclosure is illustrated in FIGS. 11-15 and includes first and second streams 200B1, 200B2 oxygen-enriched flue gas in an ignitable fluid 228.

Figure 5:
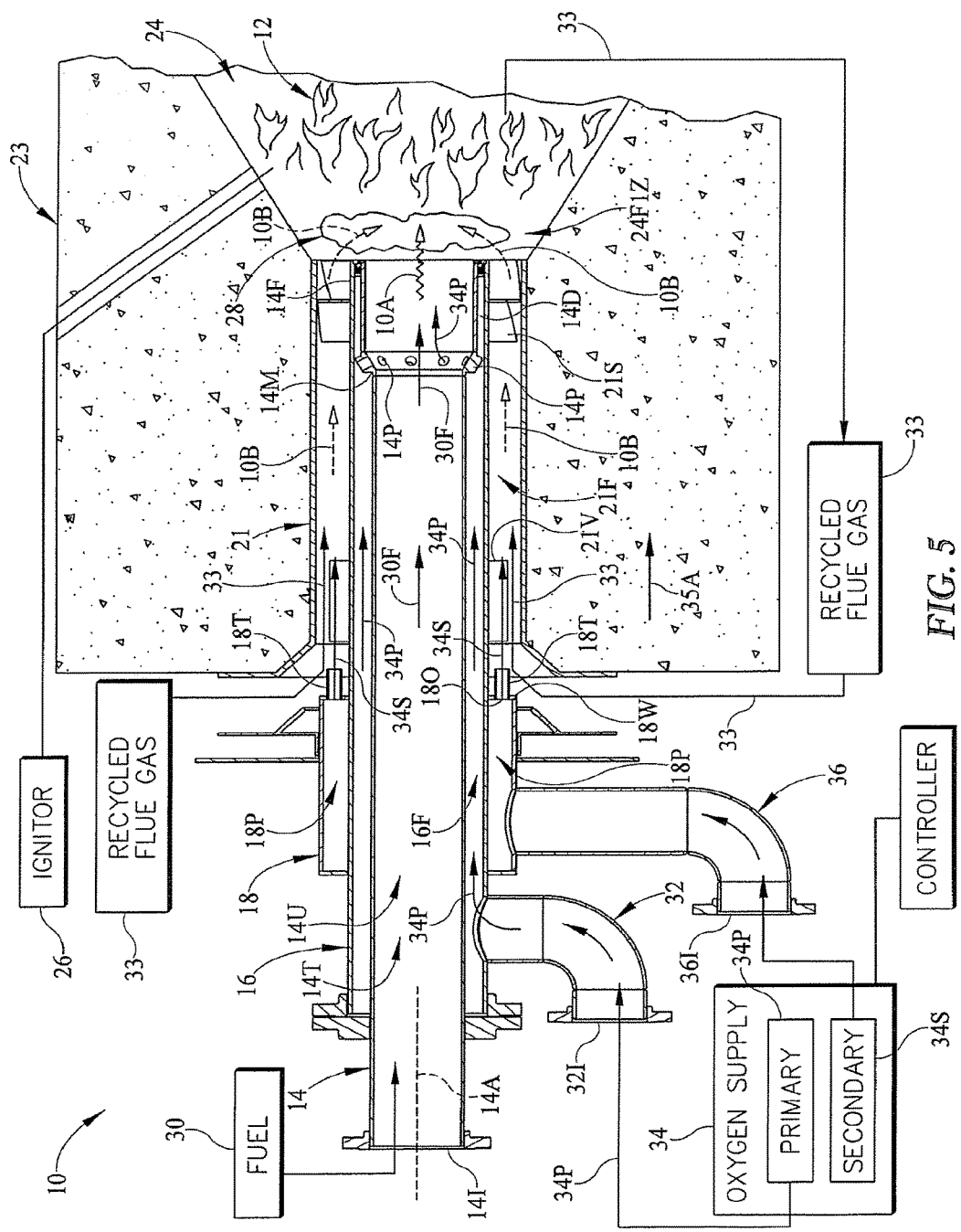
FIG. 5 is a sectional and diagrammatic view of the oxygen-fuel-flue gas combustion system shown in FIG. 1 showing a burner block formed to include a flame chamber containing a flame, a primary oxygen supply tube containing a fuel supply tube including an oxygen-fuel mixer formed to include means for conducting oxygen extant in an oxygen flow passage provided in the oxygen supply tube into a stream of fuel passing through a fuel transport passageway provided in the fuel supply tube toward the flame chamber to produce a combustible oxygen-fuel mixture, a recycled flue gas supply tube containing a downstream portion of the primary oxygen supply tube, and a short secondary oxygen supply tube containing a midstream portion of the primary oxygen supply tube and discharging a secondary stream of oxygen in an axial direction into recycled flue gas flowing in a flue gas passage provided in the recycled flue gas supply tube to produce a stream of oxygen-enriched flue gas that is first channeled by upstream radial vanes coupled to the primary oxygen supply tube and second swirled by downstream swirl plates coupled to the primary oxygen supply tube and provided in the flue gas passage and then combined in the flame chamber with the combustible oxygen-fuel mixture that is discharged from the oxygen-fuel nozzle to produce an ignitable fluid.

A combustion system 10 for burning oxygen, fuel, and recycled flue gas to produce a flame 12 is shown in perspective in FIG. 1 and in section in FIG. 5. System 10 comprises a fuel supply tube 14, a primary oxygen supply tube 16, a secondary oxygen supply tube 18, a recycled flue gas supply tube 21, and a burner block 23 formed to include a flame chamber 24 as suggested in FIG. 5. An igniter 26 is provided to ignite a fluid 28 extant in flame chamber 24 to produce flame 12 as also suggested in FIG. 5. Ignitable fluid 28 (in this first embodiment) comprises: (1) oxygen-fuel mixture 10A and (2) oxygen-enriched flue gas 10B. Ignitable fluid 28 is adapted to be combusted in a flame chamber of an air-fuel combustion system even though it has been enriched with oxygen in accordance with the present disclosure.

Fuel supply tube 14 has a horizontal central axis 14A and has a fired opened end 14F communicating with flame chamber 24 as suggested in FIG. 5. Fuel supply tube 14 comprises an upstream section 14U providing a fuel inlet port 14I, a downstream section 14D including fired opened end 14F, and an oxygen-fuel mixer 14M formed to include a series of oxygen-inlet ports 14P extending about the circumference of fuel supply tube 14 and arranged to interconnect upstream and downstream sections 14U, 14D. Upstream section 14U, oxygen-fuel mixer 14M, and downstream section 14D cooperate to form a fuel transport passageway 14T extending along the length of fuel supply tube 14 from fuel inlet port 14I to fired opened end 14F to conduct fuel 30F from fuel supply 30 to flame chamber 24. In an illustrative embodiment, oxygen-fuel mixer 14M is a nozzle configured to decelerate flow of fuel 30F passing therethrough during injection of primary oxygen 34P through oxygen-inlet ports 14P to maintain a substantially uniform flow rate in portions of fuel transport passage 14T included in upstream and downstream sections 14U, 14D.

Primary oxygen supply tube 16 extends around and in concentric relation to fuel supply tube 14 as suggested in FIG. 5 to define an annular oxygen flow passage 16F around and along fuel supply tube 14. An upstream section of primary oxygen supply tube 16 is coupled to a first oxygen-transfer tube 32 that is formed to include a primary oxygen supply inlet 32I. A primary stream 34P of oxygen is constrained to flow from oxygen supply 34, in series, through first oxygen-transfer tube 32, oxygen flow passage 16F, and oxygen-inlet ports 14P formed in oxygen-fuel mixer 14M to mix with fuel 30F flowing through fuel transport passageway 14T to produce a combustible oxygen-fuel mixture 10A that is discharged from fired opened end 14F of fuel supply tube 14 into a flame-ignition zone 24FIZ provided in flame chamber 24 as suggested in FIG. 5.

Figure 1A:
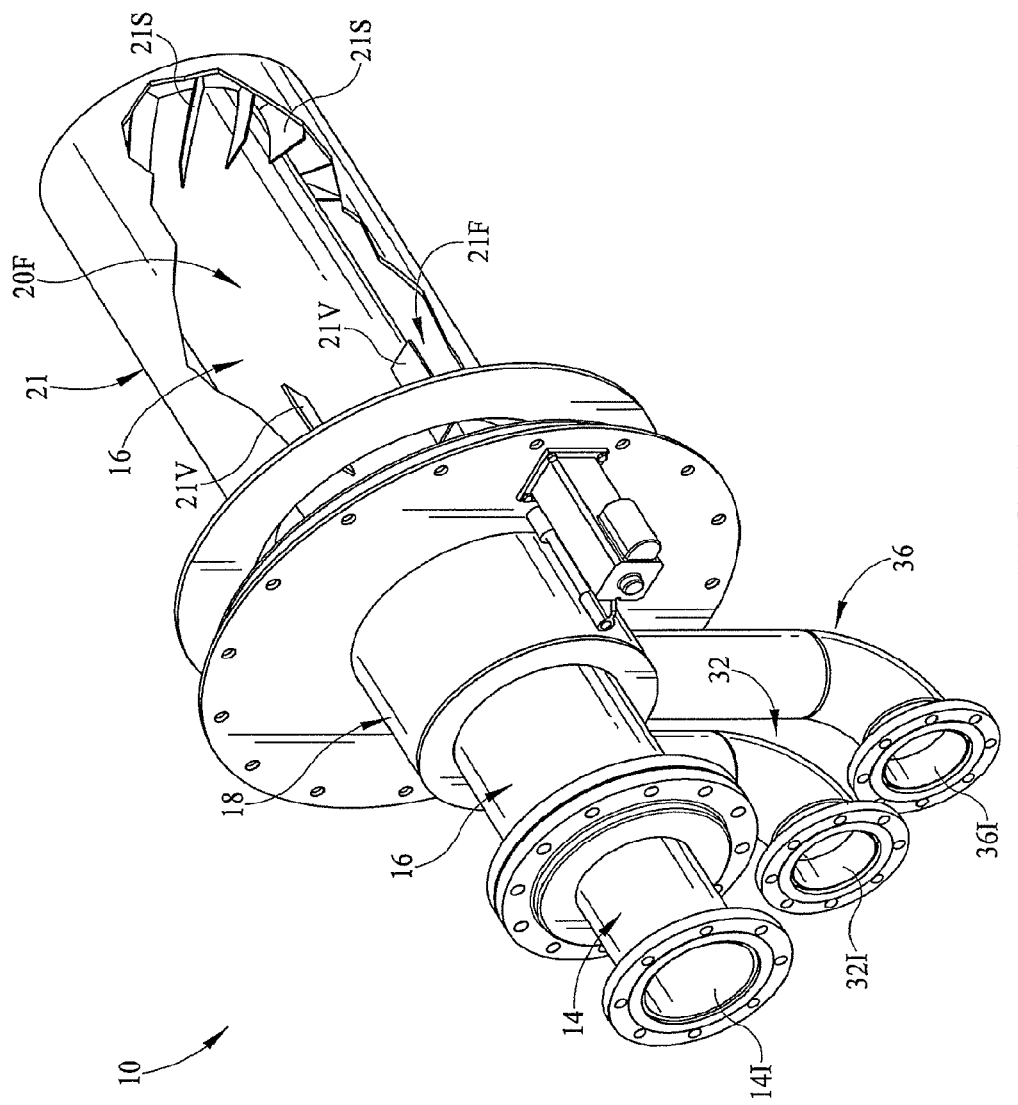
FIG. 1A is an enlarged perspective view of the burner of FIG. 1 with downstream portions broken away to show an annular flow passage formed in a recycled flue gas supply tube that surrounds a downstream end of the primary oxygen supply tube and some upstream radial vanes and some downstream swirl vanes mounted on the primary oxygen supply tube and arranged to lie in that annular flow passage.
Figure 2:
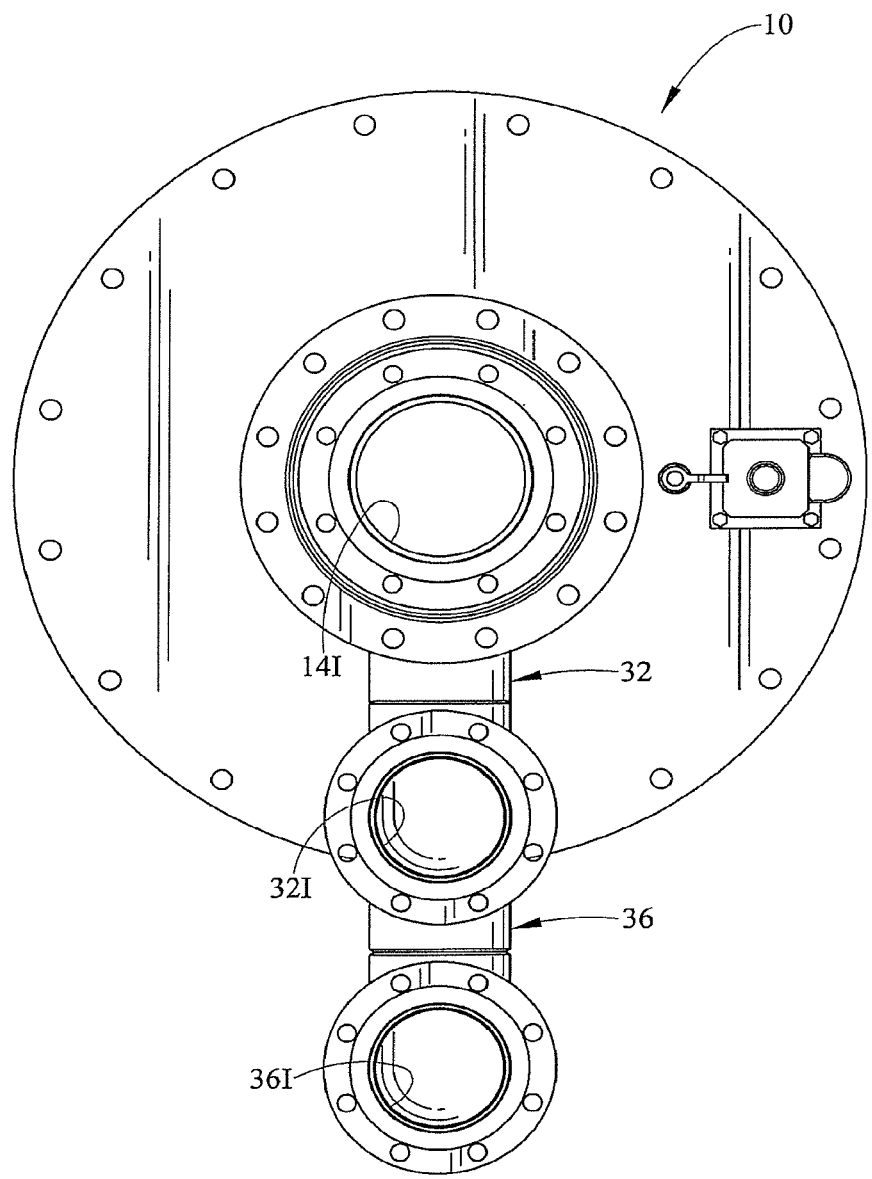
FIG. 2 is a front elevation view of the burner of FIGS. 1 and 1A.
Figure 3:
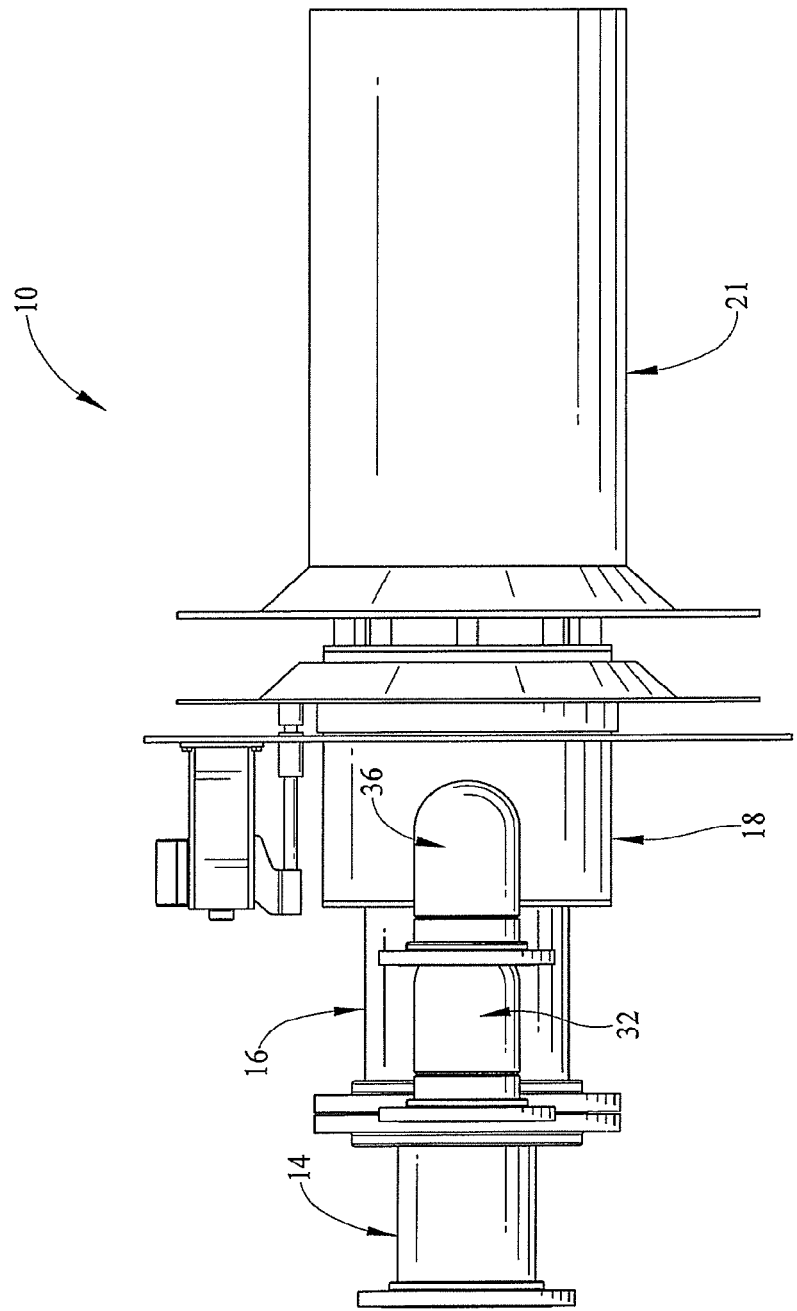
FIG. 3 is a bottom view of the burner of FIG. 2.
Figure 4:
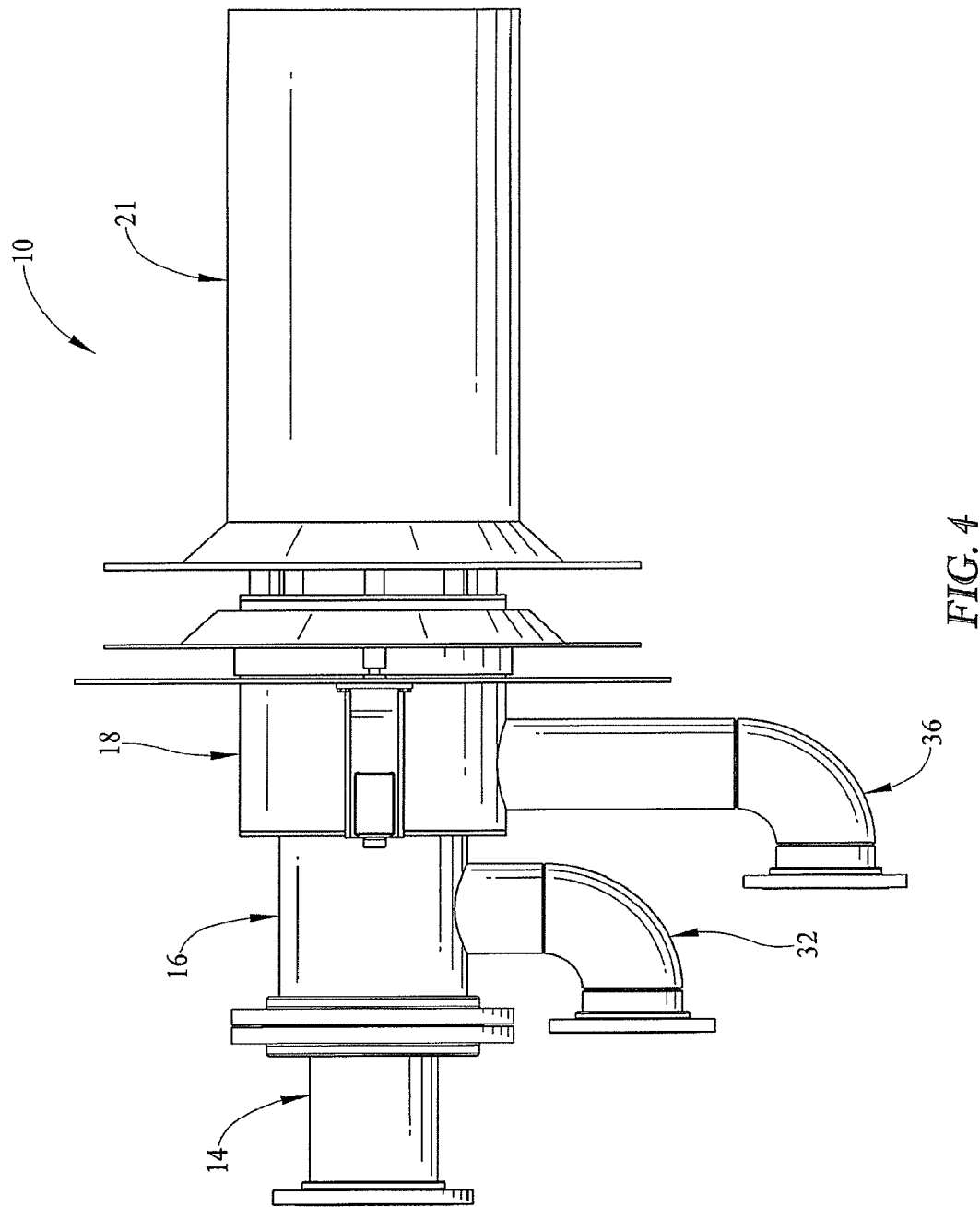
FIG. 4 is a side elevation view of the burner of FIG. 2.

Secondary oxygen supply tube 18 extends around and in concentric relation to a midstream section of primary oxygen supply tube 16 as suggested in FIG. 5 to define an annular plenum 18P and several oxygen-discharge outlets 18O. Each oxygen-discharge outlet 18O is arranged to open into plenum 18P and to discharge a stream 34S of secondary oxygen flowing through plenum 18P into a downstream annular recycled flue gas passage 21F formed between primary oxygen supply tube 16 and the surrounding recycled flue gas supply tube 21 to produce a stream of oxygen-enriched flue gas 10B as suggested in FIG. 5. This flowing stream of oxygen-enriched flue gas 10B is first channeled by radial vanes 21V provided in recycled flue gas passage 21F and then swirled by swirl vanes 21S provided in recycled flue gas passage 21F as suggested in FIGS. 1A and 5.

In illustrative embodiments, oxygen-discharge means is coupled to secondary oxygen supply tube 18 for discharging a stream 34S of secondary oxygen flowing through plenum 18P in an axial direction 35A in substantially spaced-apart parallel relation to central axis 14A to mix with recycled flue gas 33 flowing through recycled flue gas passage 21F as suggested in FIG. 5. In an illustrative embodiment, the oxygen-discharge means comprises a discharge tube 18T arranged to lie in substantially spaced-apart parallel relation to primary oxygen supply tube 16. Discharge tube 18T is formed to include an oxygen inlet port aligned in fluid communication with the oxygen-discharge outlet 18O formed in secondary oxygen supply tube 18 and an oxygen outlet port arranged to open toward the downstream flame chamber 24 as suggested in FIG. 5. It is within the scope of this disclosure to provide several circumferentially spaced-apart discharge tubes 18T on a rearwardly facing annular wall 18W included in secondary air supply tube 18 as suggested in FIG. 5.

An upstream section of secondary oxygen supply tube 18 is coupled to a second oxygen-transfer tube 36 that is formed to include secondary oxygen supply inlet 36I. A secondary stream 34S of oxygen is constrained to flow from oxygen supply 34, in series, through second oxygen-transfer tube 36, plenum 18P, and discharge tube 18T to mix with recycled flue gas 33 flowing through recycled flue gas passage 21F to produce an oxygen-enriched flue gas 10B that is discharged into the flame-ignition zone 24F in flame chamber 24 to combine with the oxygen-fuel mixture 10A extant therein to produce ignitable fluid 28 as suggested in FIG. 5. This ignitable fluid 28 produced in accordance with the present disclosure can be combusted in the flame chamber of an air-fuel combustion system even though it has been enriched with oxygen in accordance with the present disclosure.

Figure 6:
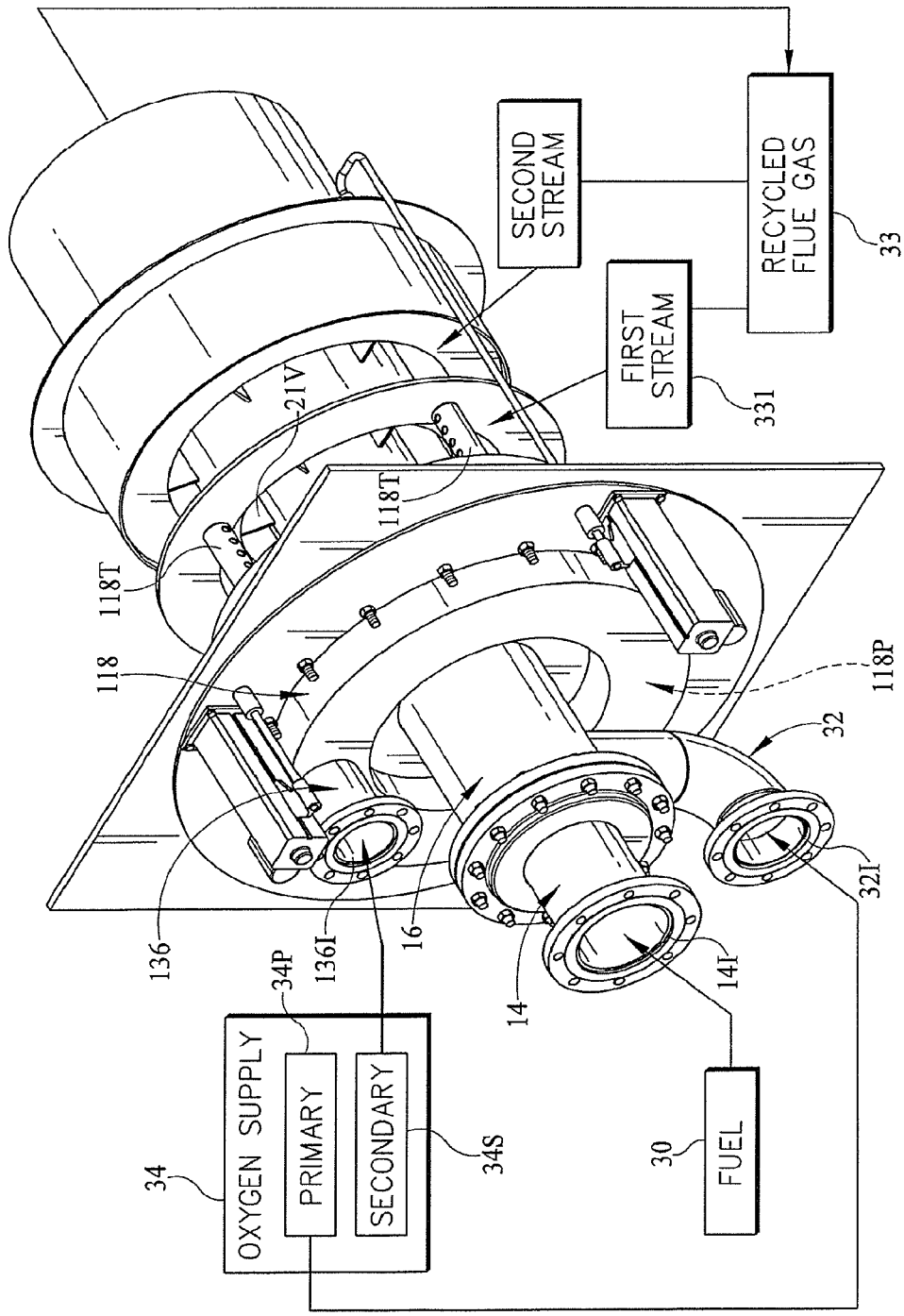
FIG. 6 is a diagrammatic illustration of an oxygen-fuel-flue gas combustion system in accordance with a second embodiment of the present disclosure showing that the system includes an illustrative burner formed to include a fuel inlet provided in a fuel supply tube, a primary oxygen supply inlet provided in an elbow-shaped first oxygen-transfer tube associated with a primary oxygen supply tube, a secondary oxygen supply inlet provided in a short straight second oxygen-transfer tube coupled to a circular upstream portion of a secondary oxygen supply tube, a recycled flue gas first stream inlet, and a recycled flue gas second stream inlet.
Figure 10:
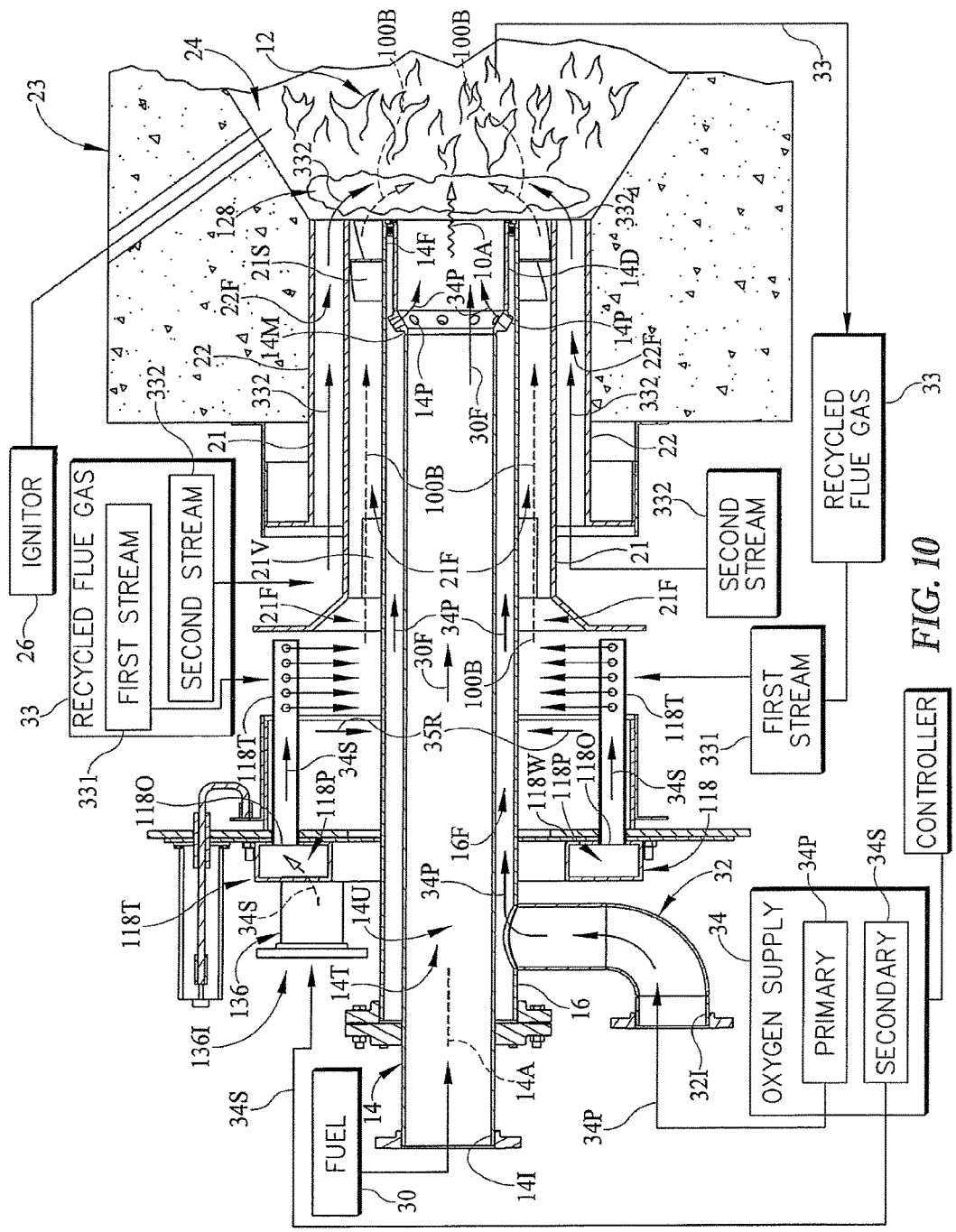
FIG. 10 is a sectional and diagrammatic view of the oxygen-fuel-flue gas combustion system shown in FIG. 6 showing a burner block formed to include a flame chamber containing a flame, a primary oxygen supply tube containing a fuel supply tube including an oxygen-fuel mixer formed to include means for conducting oxygen extant in an oxygen flow passage provided in the oxygen supply tube into a stream of fuel passing through a fuel transport passageway provided in the fuel supply tube toward the flame chamber to produce a combustible oxygen-fuel mixture, a first recycled flue gas supply tube containing a downstream portion of the primary oxygen supply tube, a second recycled flue gas supply tube containing a downstream portion of the first recycled flue gas supply tube, and a secondary oxygen supply tube surrounding a midstream portion of the primary oxygen supply tube and discharging a series of radially directed secondary streams of oxygen into a first stream of recycled flue gas flowing in a flue gas passage provided in the first recycled flue gas supply tube to produce a stream of oxygen-enriched flue gas that is first channeled up upstream radial vanes coupled to the primary oxygen supply tube and second swirled by swirl plates coupled to the primary oxygen supply tube and provided in the flue gas passage of the first recycled fluid gas supply tube and then combined in the flame chamber with the combustible oxygen-fuel mixture to provide an oxygen-enriched fluid and showing that an inert (non-oxygen-enriched) second stream of recycled flue gas is discharged into a flue gas passage provided in the second flue gas supply tube and conducted into the flame chamber to combine with the oxygen-enriched fluid therein to produce an ignitable fluid.

A combustion system 100 for burning oxygen, fuel, and recycled flue gas in accordance with a second embodiment of the disclosure to produce a flame 12 is shown in perspective in FIG. 6 and in section in FIG. 10. System 100 comprises a fuel supply tube 14, a primary oxygen supply tube 16, a secondary oxygen supply tube 118, a first recycled flue gas supply tube 21, a second recycled flue gas supply tube 22, and a burner block 23 formed to include a flame chamber 24 as suggested in FIG. 5. An igniter 26 is provided to ignite an ignitable fluid 128 extant in flame chamber 24 to produce flame 12 as also suggested in FIG. 10. Ignitable fluid 128 (in this second embodiment) comprises: (1) oxygen-fuel mixture 10A; (2) oxygen-enriched flue gas 100B; and (3) recycled flue gas 332. Ignitable fluid 128 is adapted to be combusted in a flame chamber of an air-fuel combustion system even though it has been enriched with oxygen in accordance with the present disclosure.

Fuel supply tube 14 has a horizontal central axis 14A and has a fired opened end 14F communicating with flame chamber 24 as suggested in FIG. 10. Fuel supply tube 14 comprises an upstream section 14U providing a fuel inlet port 14I, a downstream section 14D including fired opened end 14F, and an oxygen-fuel mixer 14M formed to include a series of oxygen-inlet ports 14P extending about the circumference of fuel supply tube 14 and arranged to interconnect upstream and downstream sections 14U, 14D. Upstream section 14U, oxygen-fuel mixer 14M, and downstream section 14D cooperate to form a fuel transport passageway 14T extending along the length of fuel supply tube 14 from fuel inlet port 14I to fired opened end 14F to conduct fuel 30F from fuel supply 30 to flame chamber 24. In an illustrative embodiment, oxygen-fuel mixer 14M is a nozzle configured to decelerate flow of fuel 30F passing therethrough during injection of primary oxygen 34P through oxygen-inlet ports 14P to maintain a substantially uniform flow rate in portions of fuel transport passage 14T included in upstream and downstream sections 14U, 14D.

Primary oxygen supply tube 16 extends around and in concentric relation to fuel supply tube 14 as suggested in FIG. 10 to define an annular oxygen flow passage 16F around and along fuel supply tube 14. An upstream section of primary oxygen supply tube 16 is coupled to a first oxygen-transfer tube 32 that is formed to include a primary oxygen supply inlet 32I. A primary stream 34P of oxygen is constrained to flow from oxygen supply 34, in series, through first oxygen-transfer tube 32, oxygen flow passage 16F, and oxygen-inlet ports 14P formed in oxygen-fuel mixer 14M to mix with fuel 30F flowing through fuel transport passageway 14T to produce a combustible oxygen-fuel mixture 10A that is discharged from fired opened end 14F of fuel supply tube 14 into a flame-ignition zone 24FIZ provided in flame chamber 24 as suggested in FIG. 10.

Figure 6A:
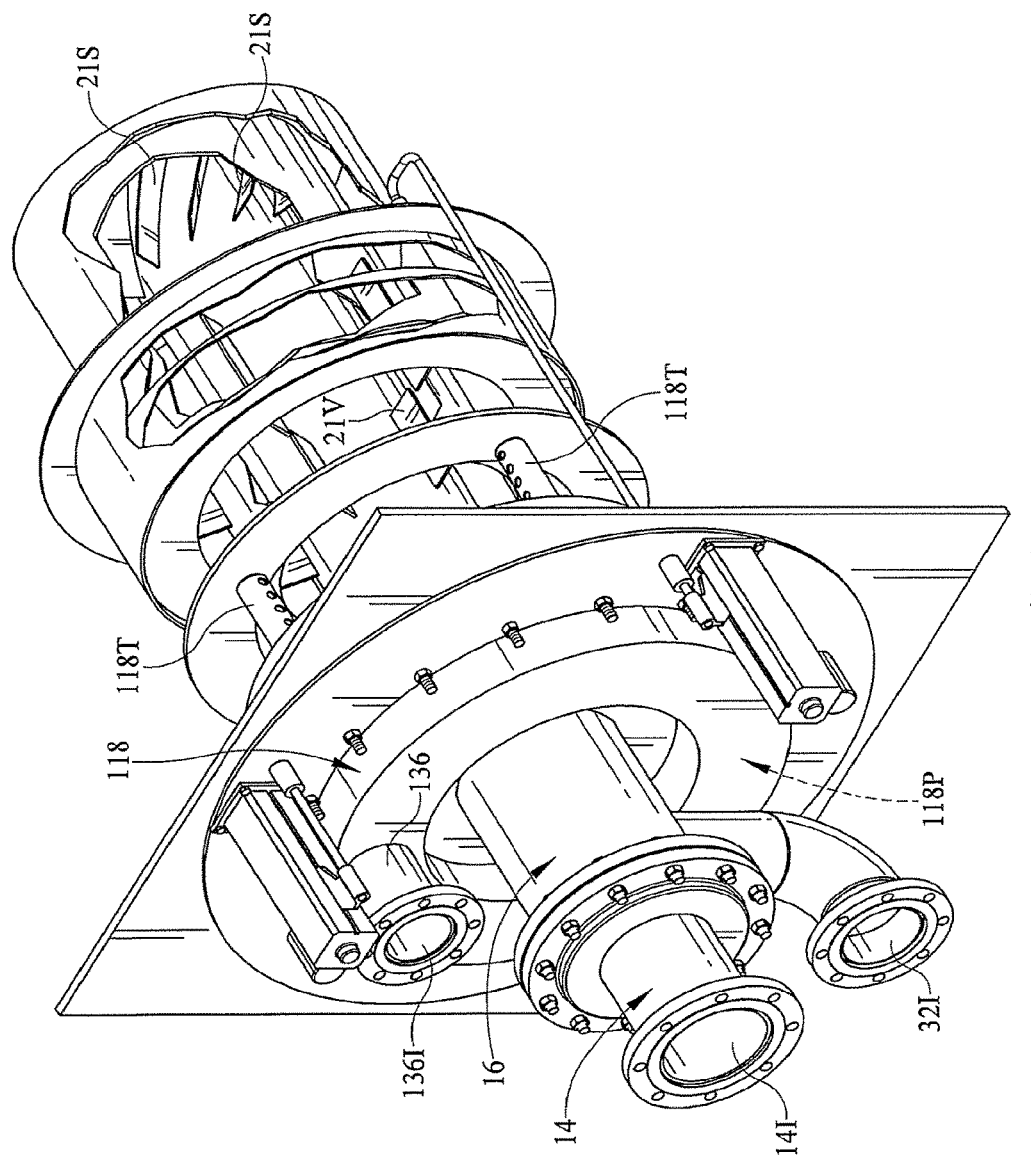
FIG. 6A is an enlarged perspective view of the burner of FIG. 6 with downstream portions broken away to show various flow passages provided in the two recycled flue gas supply tubes and showing various upstream radial vanes and downstream swirl vanes.
Figure 7:
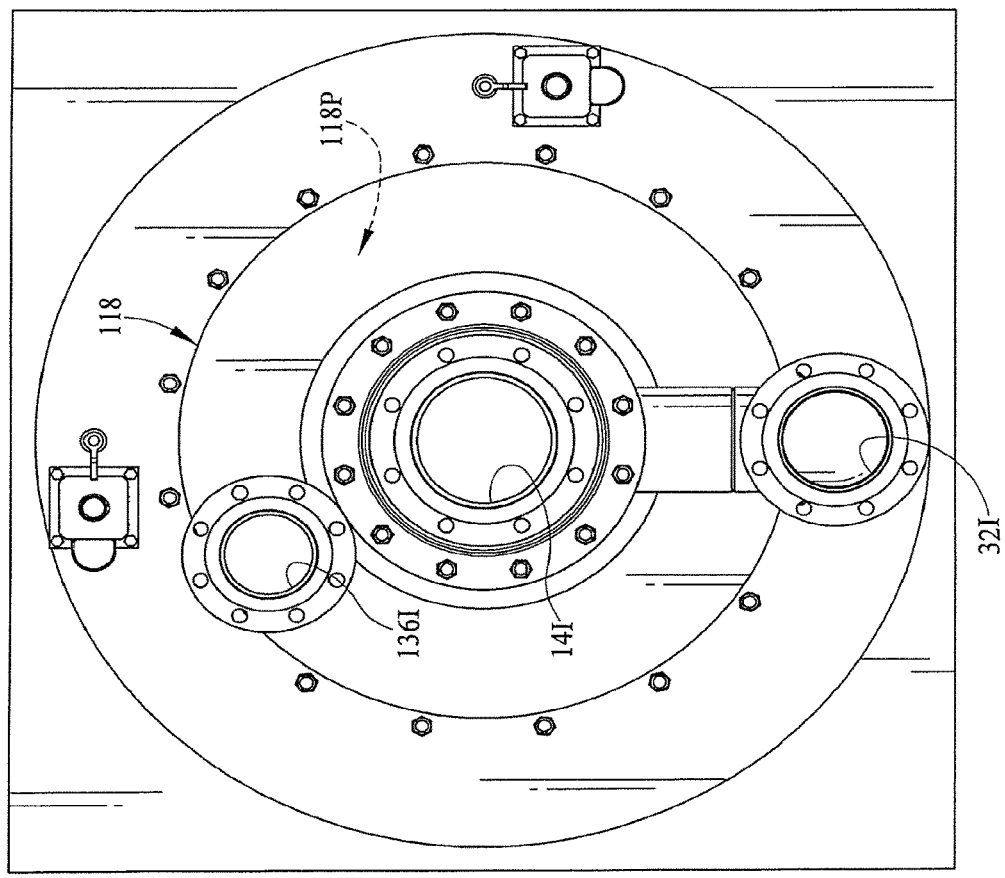
FIG. 7 is a front elevation view of the burner of FIGS. 6 and 6A.
Figure 8:
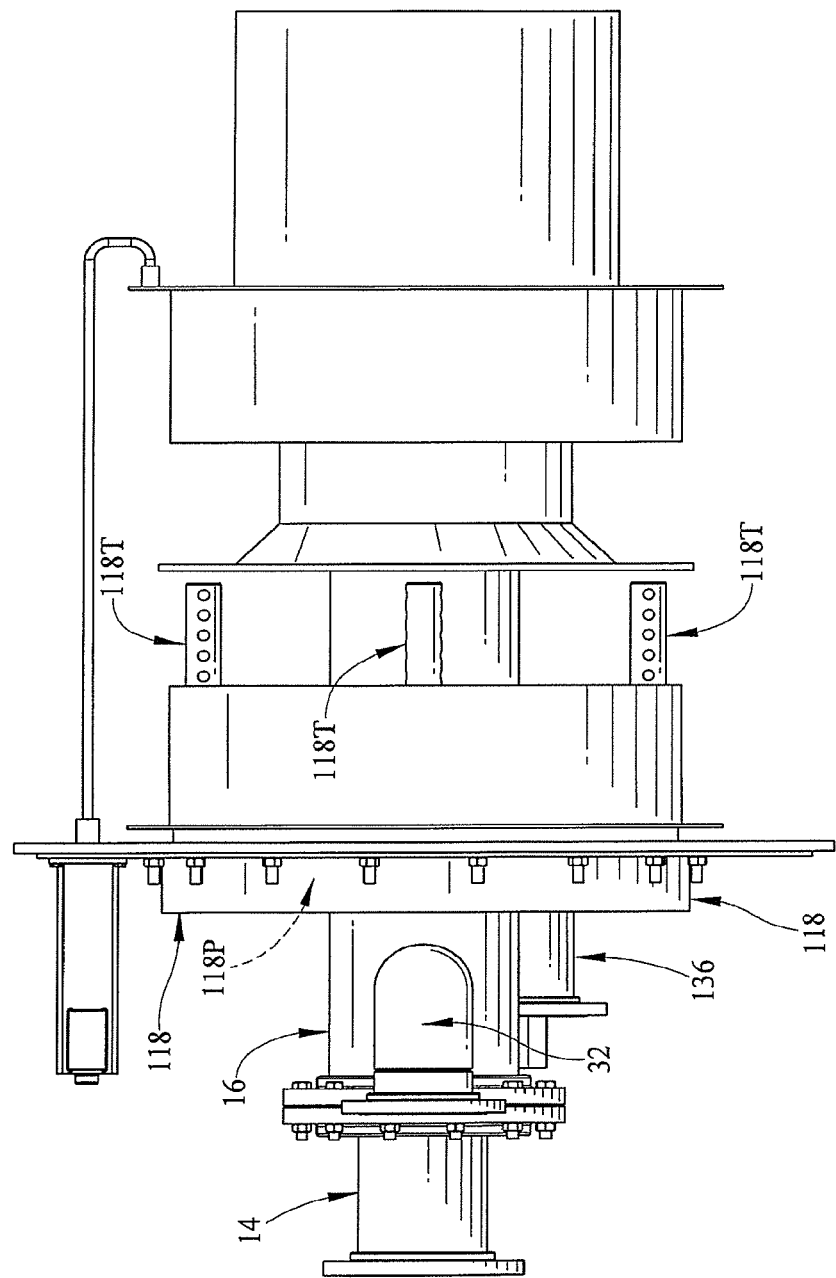
FIG. 8 is a bottom view of the burner of FIG. 7.
Figure 9:
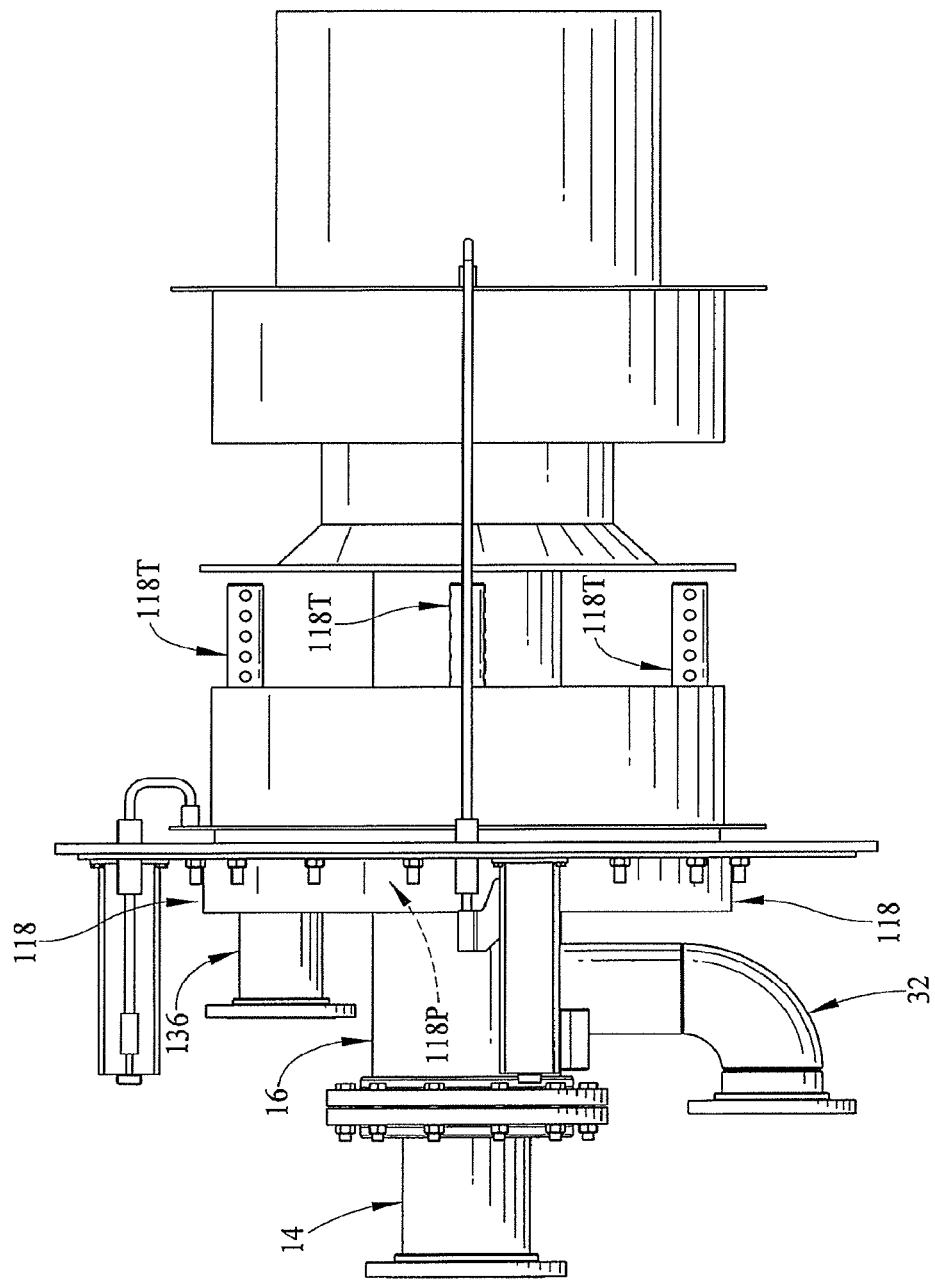
FIG. 9 is a side elevation view of the burner of FIG. 7.

Secondary oxygen supply tube 118 extends around and in concentric relation to a midstream section of primary oxygen supply tube 16 as suggested in FIG. 10 to define an annular plenum 118P and several oxygen-discharge outlets 118O. Each oxygen-discharge outlet 180 is arranged to open into plenum 118P and to discharge a stream 34S of secondary oxygen flowing through plenum 118P into a downstream annular recycled flue gas passage 21F formed between primary oxygen supply tube 116 and the surrounding first recycled flue gas supply tube 21 to produce a first stream 100B of oxygen-enriched flue gas as suggested in FIG. 10. This flowing stream 100B of oxygen-enriched flue gas is first channeled by radial vanes 21V provided in recycled flue gas passage 21F and then swirled by swirl vanes 21S provided in recycled flue gas passage 21F as suggested in FIGS. 6, 6A, and 10.

In illustrative embodiments, oxygen-discharge means is coupled to secondary oxygen supply tube 118 for discharging a stream 34S of secondary oxygen flowing through plenum 118P in a radial direction 35R toward central axis 14A of fuel supply tube 14 to mix with a first stream 331 of recycled flue gas 33 flowing through recycled flue gas passage 21F as suggested in FIG. 10. In an illustrative embodiment, the oxygen-discharge means comprises a discharge tube 118T arranged to lie in substantially spaced-apart parallel relation to primary oxygen supply tube 16. Discharge tube 118T is formed to include an oxygen inlet port aligned in fluid communication with the oxygen-discharge outlet 118O formed in secondary oxygen supply tube 118 and a series of, for example, five oxygen-discharge ports arranged to open toward an exterior surface of primary oxygen supply tube 16 as suggested in FIG. 10. It is within the scope of this disclosure to provide several circumferentially spaced-apart discharge tubes on a rearwardly facing annular wall 118W included in secondary air supply tube 118 as suggested in FIGS. 6, 6A, and 10.

An upstream section of secondary oxygen supply tube 118 is coupled to a second oxygen-transfer tube 136 that is formed to include secondary oxygen supply inlet 136I. A secondary stream 34S of oxygen is constrained to flow from oxygen supply 34, in series, through second oxygen-transfer tube 136, plenum 118P, and discharge tube 118T to mix with a first stream 331 of recycled flue gas 33 flowing through recycled flue gas passage 21F to produce an oxygen-enriched flue gas 100B1 that is discharged into the flame-ignition zone 24F1Z in flame chamber 24 to combine with the oxygen-fuel mixture 10A extant therein as suggested in FIG. 10.

First recycled flue gas supply tube 21 is arranged to extend into second recycled flue gas supply tube 22 to form a second recycled gas passage 22F therebetween as suggested in FIG. 10. A second stream 332 of recycled flue gas (that is not enriched with oxygen) is diverted from the supply of recycled flue gas 33 and constrained to flow in second recycled flue gas passage 22F without exposure to the secondary stream 34S of oxygen discharged into first recycled flue gas passage 21F as suggested in FIG. 10. This second stream 332 of recycled flue gas combines as suggested in FIG. 10 with oxygen-fuel mixture 10A and first stream 100B of oxygen-enriched flue gas in flame-ignition zone 24F1Z in flame chamber 24 to produce ignitable fluid 128. This ignitable fluid 128 produced in accordance with the present disclosure can be combusted in the flame chamber of an air-fuel combustion system even though it has been enriched with oxygen in accordance with the present disclosure.

Figure 11:
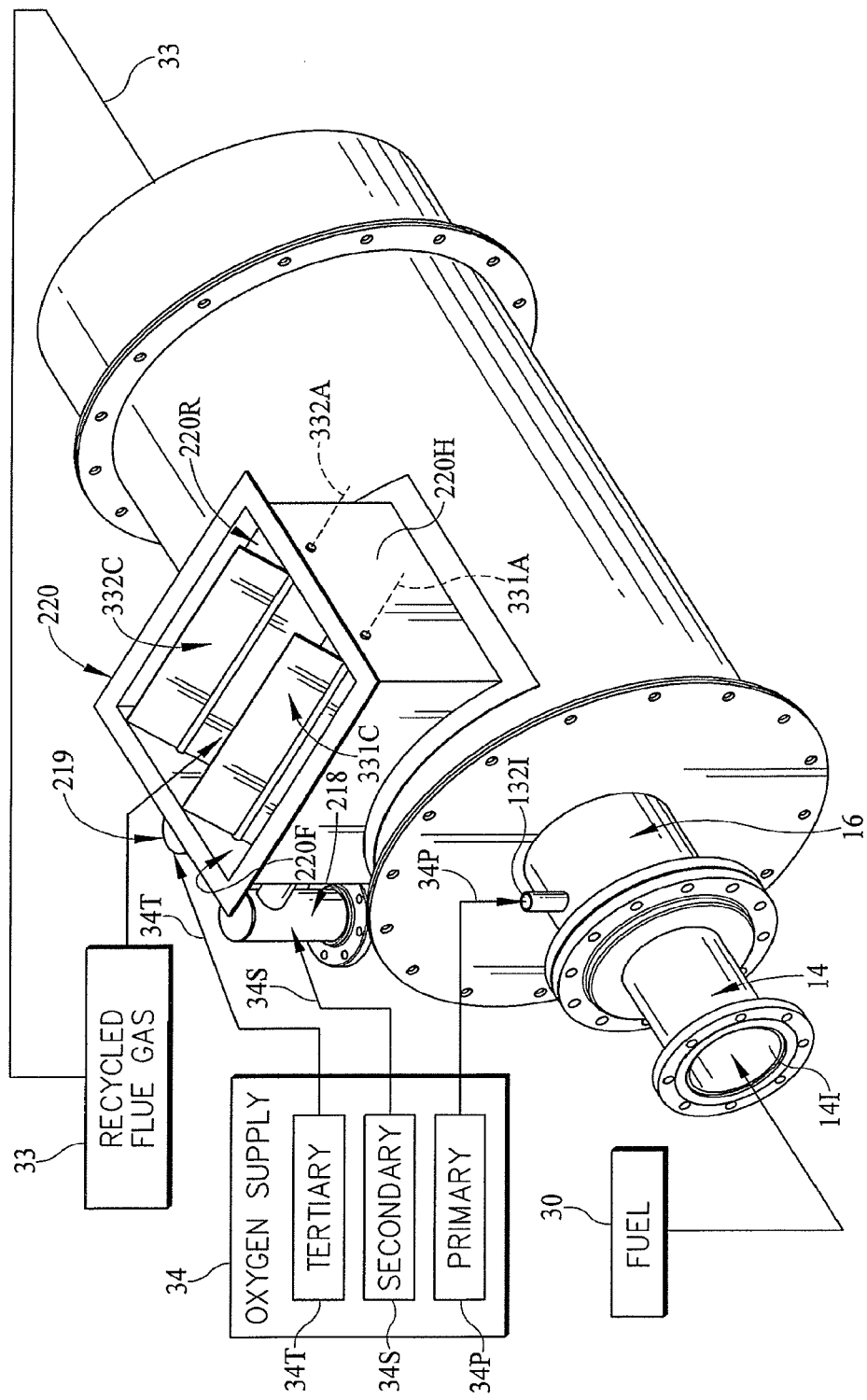
FIG. 11 is a diagrammatic illustration of an oxygen-fuel-flue gas combustion system in accordance with a third embodiment of the present disclosure showing that the system includes an illustrative burner formed to include a fuel inlet provided in a fuel supply tube, a primary oxygen supply inlet provided in an upright oxygen-transfer tube associated with a primary oxygen supply tube that extends along a horizontal central axis established by the fuel supply tube, a flue-gas distributor configured to receive recycled flue gas and partitioned to include a front gas chamber associated with a pivotable front flow-control valve and a rear gas chamber associated with a pivotable rear flow-control valve, a secondary oxygen supply inlet provided in a secondary oxygen supply tube located behind a front portion of the flue-gas distribution box and coupled in fluid communication to the front gas chamber as suggested in FIG. 11A, and a tertiary oxygen supply inlet provided in a tertiary oxygen supply tube located behind a rear portion of the flue-gas distribution box and coupled in fluid communication to the rear gas chamber as suggested in FIG. 11A.
Figure 11A:
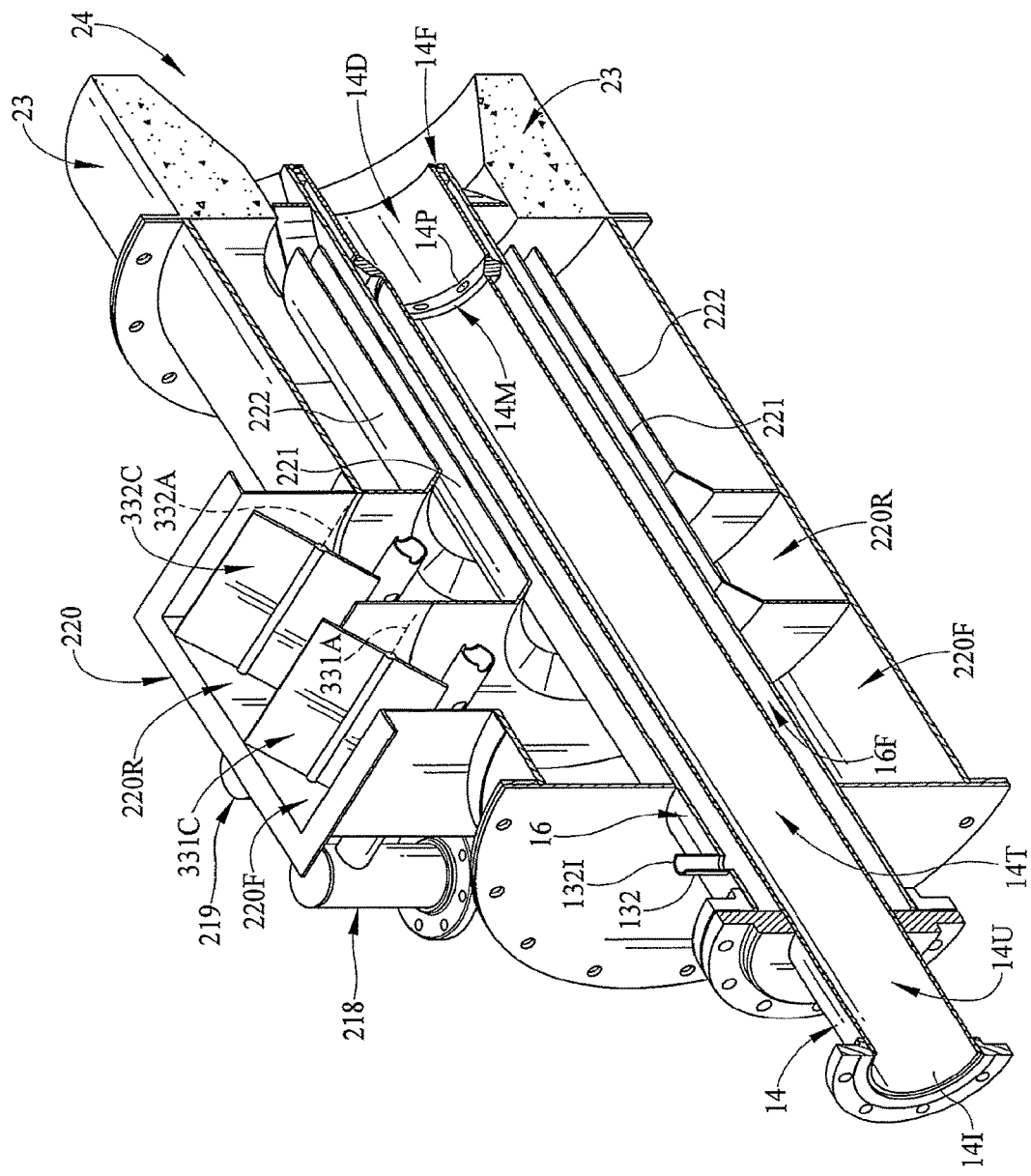
FIG. 11A is a sectional perspective view of the burner of FIG. 11 coupled to a downstream burner block that is formed to include a diverging flame chamber.
Figure 12:
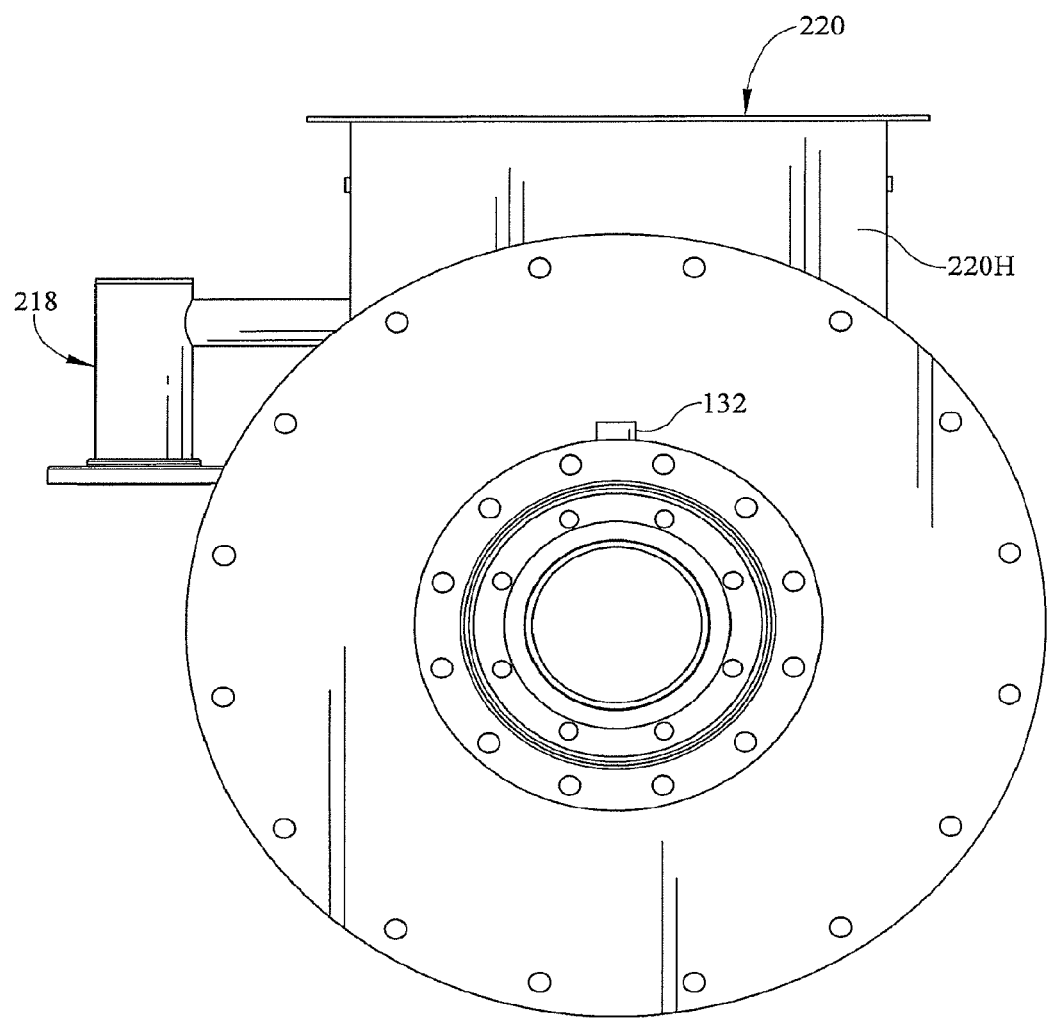
FIG. 12 is a front elevation view of the burner of FIGS. 11 and 11A.
Figure 13:
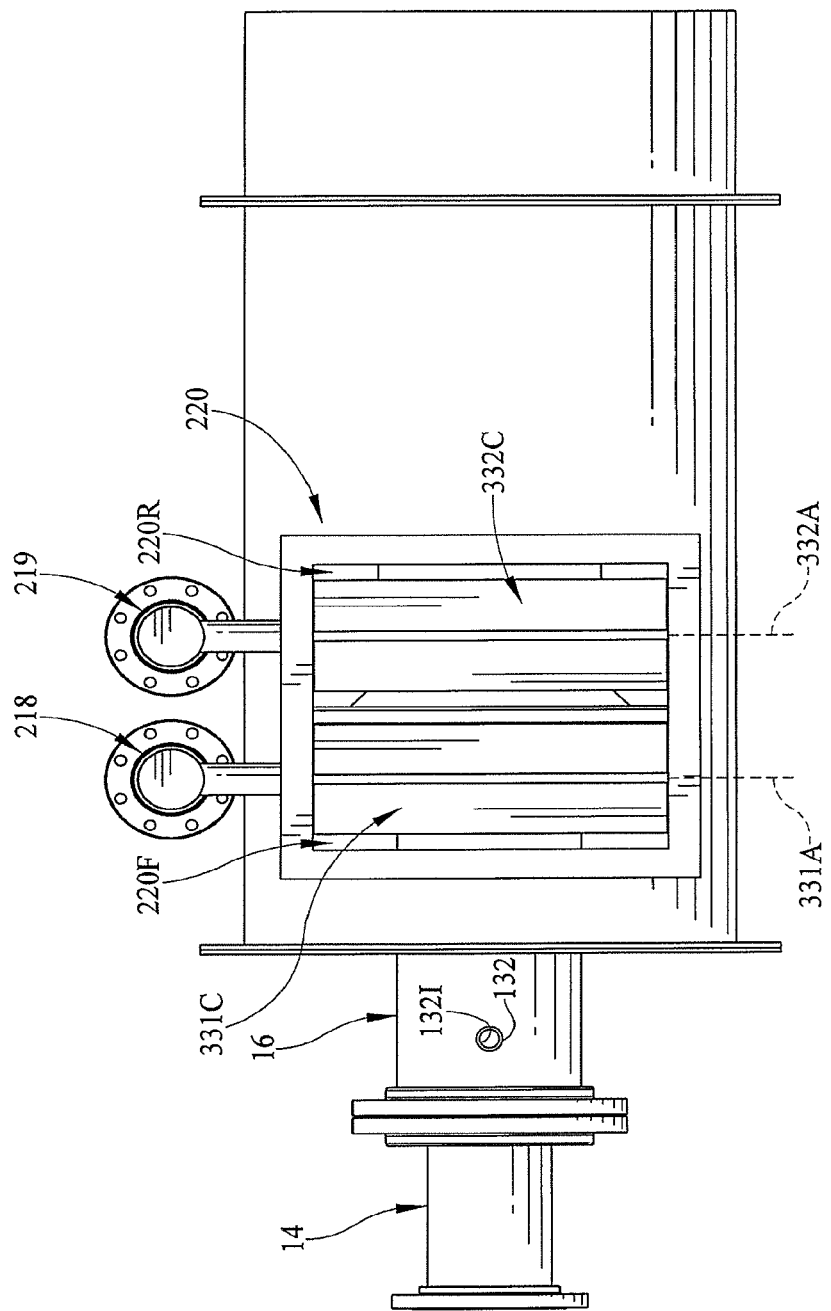
FIG. 13 is a bottom view of the burner of FIGS. 11 and 11A.
Figure 14:
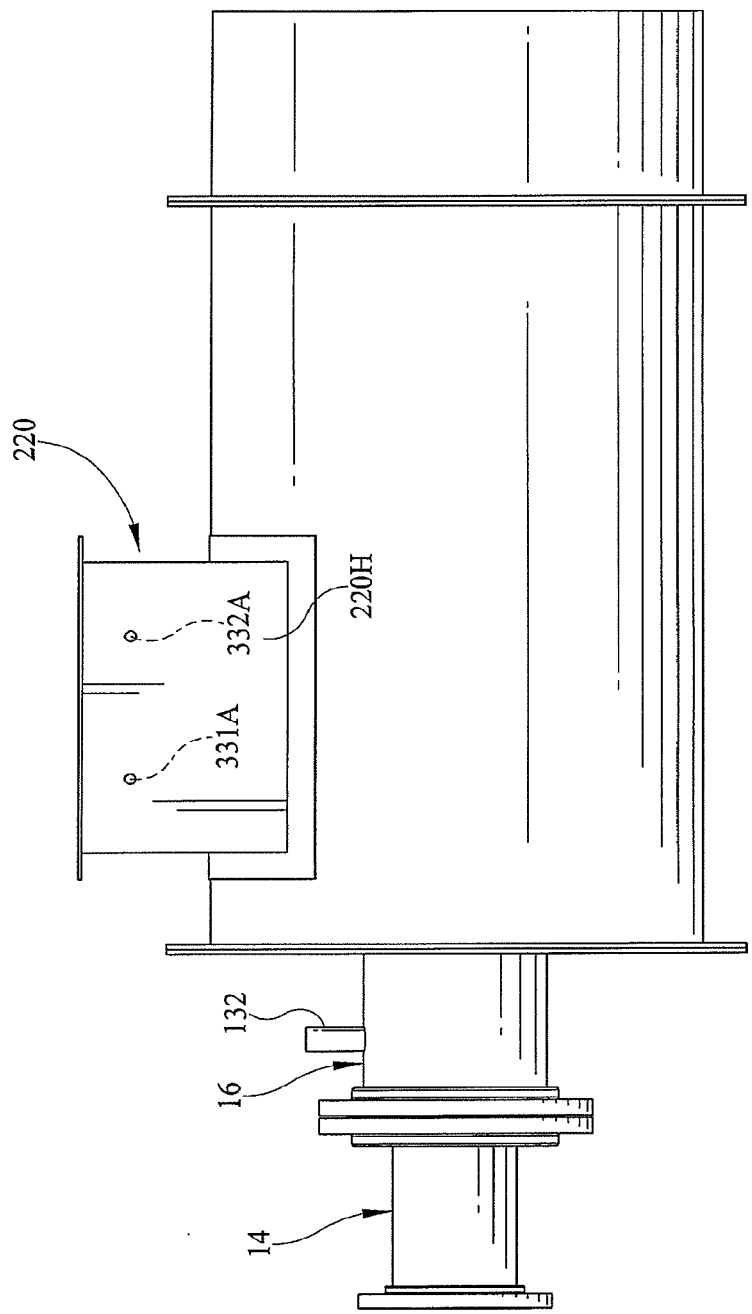
FIG. 14 is a side elevation view of the burner of FIGS. 11 and 11A.
Figure 15:
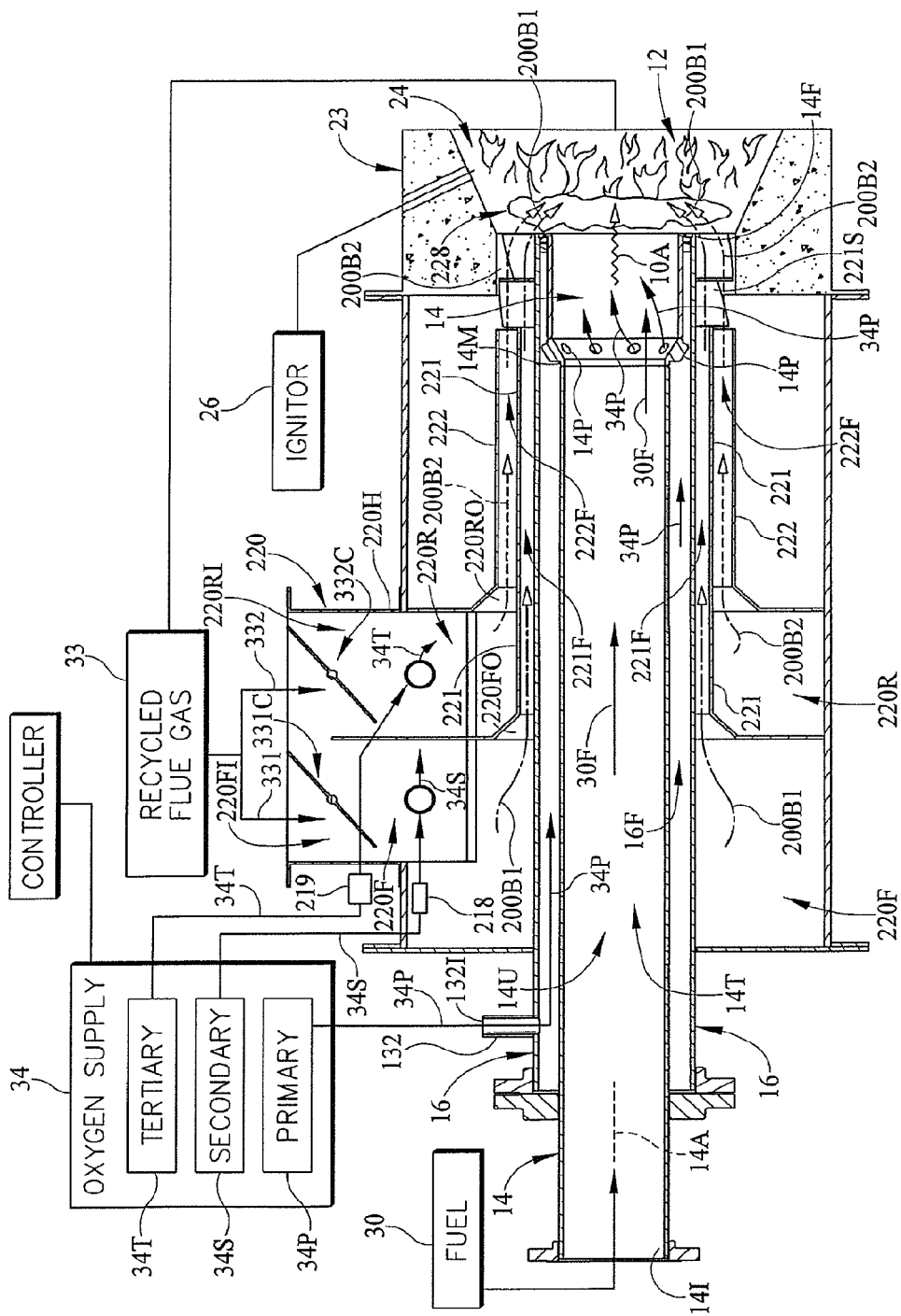
FIG. 15 is a sectional and diagrammatic view of the oxygen-fuel-glue gas combustion system shown in FIG. 6 showing a burner block formed to include a flame chamber containing a flame, a primary oxygen supply tube containing a fuel supply tube including an oxygen fuel mixer formed to include means for conducting oxygen extant in an oxygen flow passage provided in the primary oxygen supply tube into a stream of fuel passing through a fuel transport passageway provide in the fuel supply tube toward the flame chamber to produce a combustible oxygen-fuel mixture, a first recycled flue gas supply tube containing a downstream portion of the primary oxygen supply tube and receiving a first stream of oxygen-enriched flue gas discharged from the front gas chamber formed in the flue-gas distributor into a first flue gas passage formed in the first recycled flue gas supply tube, a second recycled flue gas supply tube containing a downstream portion of the first recycled flue gas supply tube and receiving a second stream of oxygen-enriched flue gas discharged from the rear gas chamber formed in the flue-gas distributor into a second flue gas passage formed in the second recycled flue gas supply tube and showing that each of the first and second streams of oxygen-enriched flue gas is first swirled by swirl plates coupled to the primary oxygen supply tube and then combined in the flame chamber with the combustible oxygen-fuel mixture to provide an ignitable fluid in an ignition zone in the flame chamber.

A combustion system 200 for burning oxygen, fuel, and recycled flue gas in accordance with a third embodiment of the disclosure to produce a flame 12 is shown in perspective in FIG. 11 and in section in FIG. 15. System 200 comprises a fuel supply tube 14, a primary oxygen supply tube 16, a secondary oxygen supply tube 218, a tertiary oxygen supply tube 219, a flue-gas distributor 220, a first recycled flue gas supply tube 221, a second recycled flue gas supply tube 222, and a burner block 23 formed to include a flame chamber 24 as suggested in FIG. 5. An igniter 26 is provided to ignite an ignitable fluid 228 extant in flame chamber 24 to produce flame 12 as also suggested in FIG. 15. Ignitable fluid 228 (in this third embodiment) comprises: (1) oxygen-fuel mixture 10A; (2) first stream 100B1 of oxygen-enriched flue gas; and (3) second stream 100B2 of recycled flue gas. Ignitable fluid 228 is adapted to be combusted in a flame chamber of an air-fuel combustion system even though it has been enriched with oxygen in accordance with the present disclosure.

Fuel supply tube 14 has a horizontal central axis 14A and has a fired opened end 14F communicating with flame chamber 24 as suggested in FIG. 15. Fuel supply tube 14 comprises an upstream section 14U providing a fuel inlet port 14I, a downstream section 14D including fired opened end 14F, and an oxygen-fuel mixer 14M formed to include a series of oxygen-inlet ports 14P extending about the circumference of fuel supply tube 14 and arranged to interconnect upstream and downstream sections 14U, 14D. Upstream section 14U, oxygen-fuel mixer 14M, and downstream section 14D cooperate to form a fuel transport passageway 14T extending along the length of fuel supply tube 14 from fuel inlet port 14I to fired opened end 14F to conduct fuel 30F from fuel supply 30 to flame chamber 24. In an illustrative embodiment, oxygen-fuel mixer 14M is a nozzle configured to decelerate flow of fuel 30F passing therethrough during injection of primary oxygen 34P through oxygen-inlet ports 14P to maintain a substantially uniform flow rate in portions of fuel transport passage 14T included in upstream and downstream sections 14U, 14D.

Primary oxygen supply tube 16 extends around and in concentric relation to fuel supply tube 14 as suggested in FIG. 15 to define an annular oxygen flow passage 16F around and along fuel supply tube 14. An upstream section of primary oxygen supply tube 16 is coupled to a first oxygen-transfer tube 132 that is formed to include a primary oxygen supply inlet 132I. A primary stream 34P of oxygen is constrained to flow from oxygen supply 34, in series, through first oxygen-transfer tube 132, oxygen flow passage 16F, and oxygen-inlet ports 14P formed in oxygen-fuel mixer 14M to mix with fuel 30F flowing through fuel transport passageway 14T to produce a combustible oxygen-fuel mixture 10A that is discharged from fired opened end 14F of fuel supply tube 14 into a flame-ignition zone 24FIZ provided in flame chamber 24 as suggested in FIG. 15.

Secondary oxygen supply tube 218 is employed to receive a secondary stream 34S of oxygen from oxygen supply 34 as suggested in FIG. 15. That secondary stream 34S of oxygen then leaves secondary oxygen supply tube 218 and is later mixed with a first stream 331 of recycled flue gas 33 to produce the first stream 200B1 of oxygen-enriched flue gas as suggested in FIG. 15.

Tertiary oxygen supply tube 219 is employed to receive a tertiary stream 34T of oxygen from oxygen supply 34 as also suggested in FIG. 15. That tertiary stream 34T of oxygen then leaves tertiary oxygen supply tube 219 and is later mixed with a second stream 332 of recycled flue gas 33 to produce the second stream 200B2 of oxygen-enriched flue gas as suggested in FIG. 15.

Each of the first and second streams 200B1, 200B2 of oxygen-enriched flue gas produced in accordance with this third embodiment of the present disclosure can comprise a predetermined oxygen content selected by a combustion system operator so that the oxygen content of first stream 200B1 of recycled flue gas is different than the oxygen content of second stream 200B2 of recycled flue gas. This feature enhances the ability of an operator of combustion system to manage oxygen contents of the various streams of products that are discharged into flame-ignition zone 24F1Z to establish a desired ratio of oxygen, fuel, and flue gas in an ignitable fluid 228 produced by combination of oxygen-fuel mixture 10A and two streams 200B1, 200B2 of oxygen-enriched flue gas. Swirl vanes 221S can be provided as suggested in FIG. 15 to swirl the combined first and second streams 200B1, 200B2 as they are discharged into flame chamber 24.

Flue-gas distributor 220 is configured to provide means for combining a stream of secondary oxygen 34S and first stream 331 of recycled flue gas to produce first stream 200B1 of oxygen-enriched flue gas and for combining a stream of tertiary oxygen 34T and second stream 332 of recycled flue gas to produce second stream 200B2 of oxygen-enriched flue gas. Flue-gas distributor 22 includes a housing 220H that is partitioned to form a front gas chamber 22DF associated with secondary oxygen 34S and a rear gas chamber 220R associated with tertiary oxygen 34T as suggested in FIG. 15.

Front gas chamber 220F of flue-gas distributor 220 has an inlet 220FI for receiving a first stream 331 of recycled flue gas 33 and an outlet 220O in fluid communication with a first flue gas passage 221F formed between primary oxygen supply tube 16 and the surrounding first recycled flue gas supply tube 221 as suggested in FIG. 15. Front controller means 331C is included in flue-gas distributor 220 for regulating flow of first stream 331 of recycled flue gas 33 into front gas chamber 220F to mix with secondary oxygen 34S present therein to produce first stream 200B1 oxygen-enriched flue gas. In an illustrative embodiment, front controller means 331C comprises a pivotable front flow-control valve mounted for pivotable movement about a pivot axis 331A at the option of a combustion system operator.

Rear gas chamber 220R of flue-gas distributor 220 has an inlet 220RI for receiving a second stream 332 of recycled flue gas 33 and an outlet 220RO in fluid communication with a second flue gas passage 222F formed between first recycled flue gas supply tube 221 and the surrounding second recycled flue gas supply tube 222 as suggested in FIG. 15. Rear controller means 332 C is included in flue-gas distributor 220 for regulating flow of second stream 332 of recycled flue gas 33 into rear gas chamber 220R to mix with tertiary oxygen 34T present therein to produce second stream 200B2 of oxygen-enriched flue gas. In an illustrative embodiment, rear controller means 332C comprises a pivotable rear flow-control valve mounted for pivotable movement about a pivot axis 332A at the option of a combustion system operator.

In illustrative embodiments, front oxygen-discharge means is coupled to secondary oxygen supply tube 218 for discharging a stream 34S of secondary oxygen into front gas chamber 220F to mix with a first stream 331 of recycled flue gas flowing therethrough to produce a first stream 200B1 of oxygen-enriched flue gas as suggested in FIG. 15. In an illustrative embodiment, the front oxygen-discharge means comprises a discharge tube 218T arranged to extend into front gas chamber 220F and to lie in a position between front flow-control valve 331C and primary oxygen supply tube 16. Discharge tube 218T is formed to include an oxygen inlet port aligned in fluid communication with an oxygen-discharge outlet formed in secondary oxygen supply tube 218 and a series of, for example, several oxygen-discharge ports arranged to open toward a front wall of housing 220H. A secondary stream 34S of oxygen is constrained to flow from oxygen supply 34, in series, through secondary oxygen supply tube 218 and discharge tube 218T to mix with a first stream 331 of recycled flue gas 33 to produce a first stream 200B2 of oxygen-enriched flue gas that flows through first recycled flue gas passage 221F and is discharged into the flame-ignition zone 24F1Z in flame chamber 24 to combine with the oxygen-fuel mixture 10A extant therein as suggested in FIG. 15.

In illustrative embodiments, rear oxygen-discharge means is coupled to tertiary oxygen supply tube 219 for discharging a stream 34T of secondary oxygen into rear gas chamber 220R to mix with a second stream 332 of recycled flue gas flowing therethrough to produce a second stream 200B2 of oxygen-enriched flue gas as suggested in FIG. 15. In illustrative embodiments, the rear oxygen-discharge means comprises a discharge tube 219T arranged to extend into rear gas chamber 220R and to lie in a position between rear flow-control valve 332C and primary oxygen supply tube 16. Discharge tube 219T is formed to include an oxygen inlet port aligned in fluid communication with an oxygen-discharge outlet formed in tertiary oxygen supply tube 219 and a series of, for example, several oxygen-discharge ports arranged to open toward a front wall of housing 220H as suggested in FIG. 15. A tertiary stream 34T of oxygen is constrained to flow from oxygen supply 34, in series, through tertiary oxygen supply tube 219 and discharge tube 219T to mix with second stream 332 of recycled flue gas 33 to produce a second stream 220B2 of oxygen-enriched flue gas that flows through second recycled flue gas passage 222F and is discharged into the flame-ignition zone 24F1Z in flame chamber 24 to combine with oxygen-fuel mixture 10A and first stream 200B1 of inert flue gas extant therein as suggested in FIG. 15.

Many existing industrial burner applications such as steam boilers and fired heaters were originally designed to operate using air/fuel combustion and thus produce large volumes of combustions products. These combustion products are also known as flue gases or furnace gases.

Oxygen-fuel combustion is a facilitating technology in an overall plan to reduce greenhouse gases produced from the burning of fossil fuels (carbon capture). Using only oxygen instead of atmospheric air for combustion significantly reduces the volume of combustion products (e.g., flue gases) at an equivalent fuel input. As a result, to adapt oxygen/fuel technology for many existing industrial air-fuel burner applications is ineffective unless substantial costs are borne to redesign and modify heat transfer surfaces and combustion spaces in these air-fuel burner applications in order to operate an oxygen-fuel combustion system. Thus, if a boiler or heater owner wanted to replace air-fuel burners with oxygen-fuel burners, it would require significant expense to modify those boilers and heaters on site.

In accordance with the present disclosure, flue gas generated by a burner in, for example, a boiler or heater, is recycled and combined with oxygen and with an oxygen-fuel mixture to produce an ignitable fluid that has an oxygen content that simulates an air-fuel mixture. This avoids the expense that would otherwise be incurred to reengineer the boilers and heaters to accept oxygen-fuel burners and yet maintains the air-fuel combustion design performance associated with those existing air-fuel boilers and heaters.

Flue gas itself is not a fluid that would normally be discharged into an ignition-zone in a flame chamber of a combustion system. Flue gas generated by oxygen-fuel combustion, conditioned and cleaned in preparation for recycle use, contains, for example, over 90% carbon dioxide ($CO_2$). Carbon dioxide is an inert gas and is used commonly in fire extinguishers and not in flame chambers. Under recycle conditions, the presence of flue gas in an ignition zone in a flame chamber would be expected to create flame instability, poor combustion performance, and unacceptable percentages of unburned fuel or even complete extinction of any flame in the flame chamber. A burner in accordance with the present disclosure is designed to enrich recycled flue gas with oxygen to create an oxygen-enriched flue gas that can be combined with an oxygen-fuel mixture in a flame chamber to produce an ignitable fluid while maintaining flame stability and producing industry-accepted combustion performance and emissions that are required to advance carbon capture technology for fossil fuel fired applications.

In accordance with the present disclosure, inert recycled flue gas is used to transport fuel passing through the fuel transport passageway formed in the fuel supply tube.

In accordance with the present disclosure, an oxygen-fuel mixer included in the fuel supply tube and arranged to receive oxygen from a primary oxygen supply tube provides increased flame stability by injecting oxygen from the primary oxygen supply tube into the inert flue gas and fuel mixture flowing through the fuel supply tube just upstream of the fuel-ignition zone in the flame chamber and the ignition point of the fuel. A suitable fuel may be used such as, for example, fluidized pulverized solid fuel. This injected oxygen from the primary oxygen supply tube enriches the fuel in the fuel supply tube to produce an oxygen-fuel mixture characterized by an oxygen level favorable for fuel ignition and flame stability.

In accordance with the present disclosure, recycled flue gas is transported to the burner through the existing combustion air windbox provided with existing air fuel burners. The recycled flue gas enters the burner in accordance with the present disclosure and passes through an oxygen distribution and injection means for enriching the recycled flue gas with oxygen from a secondary oxygen supply tube to create an oxygen-enriched flue gas. This oxygen-enriched flue gas is then discharged into the flame chamber and combined with the oxygen-fuel mixture therein to produce an ignitable fluid that allows for the burner to complete the burn that is begun at the exit of the fuel supply tube downstream from the oxygen-fuel mixer.

Varying the volume percentage of oxygen in the oxygen-fuel mixture discharged from the fuel supply tube and in the oxygen-enriched flue gas allows for adjustment of the burn for various ranks of fuels and also has the added benefit of providing reductions in produced oxides of nitrogen pollution common to the burning of fossil fuels. Reductions in produced carbon monoxide and LOI (a measure of how completely a solid fuel is consumed) are also possible through adjustment of the oxygen content in the oxygen-fuel mixture and the oxygen-enriched flue gas in accordance with the present disclosure.

A burner in accordance with the present disclosure can be fabricated from steel and alloy components. A fuel supply tube is provided in the center of the burner to transport any suitable fuel. It is within the scope of this disclosure to use some of the recycled flue gas to fluidize and transport pulverized solid fuel in the fuel transport passageway 14T formed in the fuel supply tube 14. A primary oxygen supply tube 16 receives the fuel supply tube therein and is sealed at a fired end downstream of an oxygen-fuel mixer 14M formed in the fuel supply tube 14 to create a primary oxygen flow passage 16F for conducting a stream of primary oxygen 34P to the oxygen-fuel mixer 14M. This stream of primary oxygen 34P enters the fuel transport passageway 14T and mixes with fuel 30F flowing therethrough at a point just upstream from the point of ignition in the flame chamber 24.

In accordance with the present disclosure, recycled flue gas is collected and passed by a mixing an distribution means (in a flue gas passage separate from the fuel supply tube and primary oxygen supply tube) to inject oxygen into the recycled flue gas to produce oxygen-enriched flue gas. This oxygen-enriched flue gas then passes forward and around the oxygen-fuel mixer through an annular area defined between an exterior surface of the primary oxygen supply tube and an interior surface of the recycled flue gas supply tube. The oxygen-enriched flue gas then passes through an adjustable swirler configured to create a swirling flow at the point in the flame chamber 24 where the oxygen-fuel mixture and the oxygen-enriched flue gas exits the burner. This swirling flow helps to combine those mixtures and assists in stabilizing a flame produced in the flame chamber 24. The oxygen-enriched flue gas introduces into the flame chamber 24 the balance of the oxygen flow required to complete combustion of the fuel.

A third annular area is created between the exterior surface of the first recycled flue gas supply tube and the interior surface of a surrounding second recycled flue gas supply tube in certain embodiments in accordance with the present disclosure when it is desired to have an oxygen content of greater than or equal to 20.9% in ignitable fluid produced by combining the oxygen-fuel mixture and the oxygen-enriched flue gas. The intent in accordance with the present disclosure is to pass the required flue gas volume to simulate air-fuel furnace conditions, while at the same time creating oxygen-rich primary and secondary zones in the flame chamber 24 which can be adjusted in accordance with the present disclosure to create optional flame and emissions performance. The ability in accordance with the present disclosure to create oxygen concentrations greater than or equal to 20.9% in the primary and secondary flame zones in the flame chamber 24 allows the use of previously unacceptable low-rank coals and low BTU content fuel gases to be used as fuel while producing acceptable emissions and thermal performance.

The invention claimed is:

1. A method for combining recycled flue gas, oxygen, and fuel to produce an ignitable fluid, comprising:
   mixing a primary stream of oxygen from a primary oxygen supply tube of a combustion system with pulverized fuel and a transport gas from a fuel supply tube of the combustion system to produce a combustible oxygen-fuel mixture;
   combining a secondary stream of oxygen and a stream of recycled flue gas to produce a stream of oxygen-enriched flue gas that is separate from the combustible oxygen-fuel mixture, wherein combining the secondary stream of oxygen and the stream of recycled flue gas includes:

receiving, by a plenum formed between the primary oxygen supply tube and a secondary oxygen supply tube arranged to surround the primary oxygen supply tube, the secondary stream of oxygen; and discharging, from the plenum in a radial direction toward a central axis extending through the fuel supply tube, the secondary stream of oxygen to combine with the stream of recycled flue gas in the recycled flue gas passage, wherein the secondary oxygen supply tube includes an annular downstream portion separated from the primary oxygen supply tube and formed to include the plenum and the oxygen discharge outlet and a tubular upstream portion coupled to the annular downstream portion and arranged to lie in spaced-apart side-by-side relation to the primary oxygen supply tube; and combining the stream of oxygen-enriched flue gas and the combustible oxygen-fuel mixture to produce an ignitable fluid.

2. The method of claim 1, wherein the combustible oxygen-fuel mixture has an oxygen content in excess of 20.9%.

3. The method of claim 1, wherein the stream of oxygen-enriched flue gas has an oxygen content in excess of 20.9%.

4. The method of claim 1, wherein the ignitable fluid has an oxygen content of at least 20.9%.

5. The method of claim 1, wherein the stream of recycled flue gas includes non-oxygen-enriched inert recycled flue gas.

6. The method of claim 1, wherein the method includes combining the stream of oxygen-enriched flue gas, the combustible oxygen-fuel mixture, and an additional stream of recycled flue gas to produce the ignitable fluid.

7. A method for combining recycled flue gas, oxygen, and fuel to produce an ignitable fluid, comprising:

mixing a primary stream of oxygen from a primary oxygen supply tube of a combustion system with fuel and a transport gas from a fuel supply tube of the combustion system to produce a combustible oxygen-fuel mixture;

combining a secondary stream of oxygen and a stream of recycled flue gas to produce a stream of oxygen-enriched flue gas that is separate from the combustible oxygen-fuel mixture, wherein combining the secondary stream of oxygen and the stream of recycled flue gas includes:

receiving, by a plenum formed between a secondary oxygen supply tube of the combustion system and the primary oxygen supply tube, the secondary stream of oxygen; and discharging, from the plenum through an oxygen-discharge outlet arranged to open into the plenum, the secondary stream of oxygen into a recycled flue gas passage of the combustion system to combine with the stream of recycled flue gas in the recycled flue gas passage, wherein the secondary oxygen supply tube includes an annular downstream portion separated from the primary oxygen supply tube and formed to include the plenum and the oxygen discharge outlet and a tubular upstream portion coupled to the annular downstream portion and arranged to lie in spaced-apart side-by-side relation to the primary oxygen supply tube; and combining the stream of oxygen-enriched flue gas and the combustible oxygen-fuel mixture to produce an ignitable fluid.

8. The method of claim 7, wherein the fuel from the fuel supply tube is pulverized solid fuel.

9. The method of claim 7, wherein the transport gas from the fuel supply tube is atmospheric air.

10. The method of claim 7, wherein the transport gas from the fuel supply tube is recycled flue gas.

11. The method of claim 7, wherein discharging the secondary stream of oxygen into the recycled flue gas passage includes discharging the secondary stream of oxygen in an axial direction along an axis parallel to a central axis extending into the recycled flue gas passage.

12. The method of claim 7, wherein discharging the secondary stream of oxygen into the recycled flue gas passage includes discharging the secondary stream of oxygen in a radial direction toward a central axis extending through the fuel supply tube.

13. The method of claim 7, wherein the fuel and the transport gas from the fuel supply tube mix with the primary stream of oxygen prior to combustion.

14. A method for combining recycled flue gas, oxygen, and fuel to produce an ignitable fluid, comprising:

mixing a primary stream of oxygen from a primary oxygen supply tube of a combustion system with pulverized fuel and a transport gas from a fuel supply tube of the combustion system to produce a combustible oxygen-fuel mixture having an oxygen concentration that is different than 20.9%;

combining the secondary stream of oxygen and a stream of recycled flue gas to produce a stream of oxygen-enriched flue gas that is separate from the combustible oxygen-fuel mixture and has an oxygen concentration that is different than 20.9%, wherein combining the secondary stream of oxygen and the stream of recycled flue gas includes:

receiving, by a plenum formed between the primary oxygen supply tube and a second oxygen supply tube arranged to surround the primary oxygen supply tube, a secondary stream of oxygen; and discharging, from the plenum through an oxygen-discharge outlet arranged to open into the plenum, the secondary stream of oxygen into a recycled flue gas passage of the combustion system to combine with the stream of recycled flue gas in the recycled flue gas passage;

wherein the secondary oxygen supply tube includes an annular downstream portion separated from the primary oxygen supply tube and formed to include the plenum and the oxygen discharge outlet and a tubular upstream portion coupled to the annular downstream portion and arranged to lie in spaced-apart side-by-side relation to the primary oxygen supply tube; and combining the stream of oxygen-enriched flue gas and the combustible oxygen-fuel mixture to produce an ignitable fluid having an oxygen concentration of at least 20.9%.

15. The method of claim 14, wherein mixing the primary stream of oxygen with the pulverized fuel and the transport gas includes communicating the primary stream of oxygen through oxygen-injection holes formed in the fuel supply tube.

16. The method of claim 14, wherein the ignitable fluid is produced in a flame chamber arranged to communicate with a fuel transport passageway of the fuel supply tube and a recycled flue gas passage.

17. The method of claim 14, wherein combining the secondary stream of oxygen and the stream of recycled flue gas includes constraining the secondary stream of oxygen to flow into a recycled flue gas passage through which the stream of recycled flue gas is flowing.

18. The method of claim 14, wherein the method includes:
   combining a stream of tertiary oxygen and an additional stream of recycled flue gas to produce an additional stream of oxygen-enriched flue gas; and
   combining the additional stream of oxygen-enriched flue gas, the stream of oxygen-enriched flue gas, and the combustible oxygen-fuel mixture to produce the ignitable fluid.

19. The method of claim 18, wherein combining the stream of tertiary oxygen and the additional stream of recycled flue gas includes regulating flow of the additional stream of recycled flue gas into a gas chamber having the tertiary oxygen present therein.

20. The method of claim 14, wherein combining the secondary stream of oxygen and the stream of recycled flue gas includes regulating flow of the stream of recycled flue gas into a gas chamber having the secondary steam of oxygen present therein.

\* \* \* \* \*